(12) United States Patent
Kasami et al.

(10) Patent No.: US 6,312,780 B1
(45) Date of Patent: Nov. 6, 2001

(54) OPTICAL RECORDING MEDIUM

(75) Inventors: Yutaka Kasami, Kanagawa; Osamu Kawakubo, Saitama; Katsuhiro Seo, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/504,812

(22) Filed: Feb. 16, 2000

(30) Foreign Application Priority Data

Feb. 21, 1999 (JP) ................................................. 11-074247
Jun. 30, 1999 (JP) ................................................. 11-186843

(51) Int. Cl.$^7$ ....................................................... B32B 3/02
(52) U.S. Cl. ........................ 428/64.1; 428/64.4; 428/64.5; 428/64.6; 428/457; 428/913; 430/270.13; 430/495.1; 430/945; 369/283; 369/288
(58) Field of Search ................................. 428/64.1, 64.2, 428/64.4, 64.5, 64.6, 457, 688, 702, 913; 430/270.13, 495.1, 945; 369/283, 288

(56) References Cited

U.S. PATENT DOCUMENTS 6,115,351 * 9/2000 Utsunomiya ........................ 369/275.1

* cited by examiner

Primary Examiner—Elizabeth Evans
(74) Attorney, Agent, or Firm—Sonnenschein, Nath & Rosenthal

(57) ABSTRACT

A phase change optical recording medium which enables optimum direct overwrite even under high speed high density conditions without degrading repetition durability or storage stability of recorded signals. To this end, the phase change optical recording medium has a recording layer formed at least of a phase change material and is recorded and/or reproduced with a laser light beam having a wavelength ranging between 380 nm and 420 nm. A ratio Ac/Aa, where Ac is the absorption rate of said recording layer in a crystalline state and Aa is the absorption rate of said recording layer in an amorphous state, is not less than 0.9, and a crystallization promoting layer promoting the crystallization of the phase change material is contacted with at least one surface of the recording layer. By exploiting the absorption rate control and the crystallization promotion in combination, it is possible to positively compensate the difference between the physical properties of the crystal phase and those of the amorphous phase to realize optimum direct overwrite.

41 Claims, 13 Drawing Sheets

2

OPTICAL RECORDING MEDIUM

RELATED APPLICATION DATA

The present application claims priority to Japanese Application No. P11-074247 filed Feb. 21, 1999 and Japanese Application No. P11-186843 filed Jun. 30, 1999, which applications are incorporated herein by reference to the extent permitted by law.

BACKGROUND OF THE INVENTION

1. Field of the Invention

This invention relates to a phase change optical recording medium. More particularly, it relates to a phase change optical recording medium capable of high-speed direct overwriting.

2. Description of the Prior Art

As a practical example of an overwritable optical disc, employing a phase change recording material, a so-called DVD-RAM is commercialized, in which a linear velocity of 6 m/sec, a bit length of 0.41 µm, track pitch of 0.74 µm, a laser wavelength of approximately 650 nm, a data transfer rate of 11 Mbpa and a recording capacity of 2.6 GB have been realized.

For realizing a larger capacity and a higher transfer rate, it is effective to reduce the spot size of the recording laser and to raise the recording linear velocity. As a practical technique for reducing the spot size of the recording laser light, there are a method of shortening the laser wavelength and a method of increasing the numerical aperture of the objective lens.

In particular, if the method of reducing the laser wavelength and the method of increasing the numerical aperture of the objective lens are used in combination, the spot size may be made smaller than if one or the other method by itself is used. For example, if a blue to purple laser having a wavelength in the vicinity of 400 nm is used as a light source and an objective lens with a numerical aperture NA of 0.85 is used, it is theoretically possible to realize a still higher recording density.

However, the condition for performing direct overwrite at an elevated speed on the phase change optical disc is more stringent for the following reason:

In general, in a phase change optical disc, the laser light of a high power is illuminated thereon to fuse the recording layer by raising its temperature to higher than the fusing temperature of the recording layer. The recording layer then is quenched to write recording marks. The recorded marks are crystallized, that is erased, by being maintained in a temperature range intermediate between the crystallization initiating temperature and the melting point of the recording layer for a time necessary for the recording layer to become crystalline.

If the method for shortening the laser wavelength or the method of increasing the numerical aperture of the objective lens is adopted, and/or under the conditions of a higher recording linear velocity, the temperature on a point on the optical disc is changed within a shorter time than conventionally. FIG. 24 shows, as an example showing the results of how the temperature on a given point on the disc is varied with lapse of time. As may be seen from FIG. 24, the time during which the temperature is kept higher than the crystallization temperature, assumed to be 400° C. as an example, becomes shorter the shorter is the recording and/or reproducing wavelength.

Thus, in a recording material having the crystallization speed which is the same as the conventional speed, it becomes difficult to crystallize, that is to erase, the recorded amorphous marks.

If, in case of a direct overwrite (DOW) in which recording is made as the sole laser light power level is controlled temporally, the spot size is small, or the recording linear speed is high, the result is promoted distortion of the mark shape ascribable to the difference in the physical properties between the amorphous phase and the crystalline phase, as characteristic of the phase-change recording. That is, under this condition, if a mark is overwritten in superposition on already written recording marks, the recording marks tend to be larger in size than if the marks are newly written in a blank crystalline state area.

This is caused by the difference in the response to the laser light (optical constant), the manner of heat transmission caused by the reaction with the laser light (thermal conductivity) or in the manner of use of the heat between the amorphous phase and the crystalline phase. It is noted that latent heat at the time of fusion is unnecessary. Meanwhile, if the spot size is large, with the linear speed being low, temporary temperature changes of the recording film are moderate, such that heat is conducted before the already present marks reach the laser so that the crystallization temperature is kept from the outset. Therefore, the state equivalent to a state in which the marks in actuality were not present (preceding crystallization) is realized, thus evading the aforementioned problem.

Due to this problem, a higher recording density and a higher transfer rate are difficult to achieve in case of a routinely used phase change optical disc having a fourlayer structure comprised of a ZnS—SiO$_2$ layer, a recording layer, a ZnS—SiO$_2$ layer and a reflective layer with the Ac/Aa ratio being lower than 0.9, Ac being a rate of absorption for the recording layer in the crystalline state and Aa being a rate of absorption for the recording layer in the amorphous state. For example, it has been shown experimentally that, as the linear speed is higher, the jitter value become worse, as shown for example in FIG. 25.

For solving this difficulty, it may be envisaged to increase the crystallization temperature of the recording layer. That is, it suffices if the time necessary for crystallization is shortened to raise the rate of erasure to render preceding crystallization liable to occur more readily.

However, it is virtually impossible to find a material in which phase change may occur reversibly and which has a crystallization temperature not lower than that realized in the past and to apply this material to an optical disc.

With this in view, there is proposed in Japanese Laying-Open Patent H-1-92937, Japanese Laying-Open Patent H-6-195747 or in Japanese Laying-Open Patent H-9-532424 a technique in which the crystallization promoting material, effective in improving the crystallization speed of the amorphous phase is provided adjacent to the recording layer in place of raising the crystallization speed of the recording material itself, in order to increase the crystallization speed of the recording layer. This technique has, however, a drawback that it tends to lower the storage stability of the recording marks in a temperature range encountered under the routine using conditions and that the recording marks are erased by the laser light used for reproduction.

On the other hand, there is also proposed in, for example, Japanese Laying-Open Patent H-8-124218 or Japanese Laying-Open Patent H-9-91755 a technique in which the state of the rate of absorption usually higher in the amorphous phase than in the crystallization phase is reversed by controlling the layering structure of the optical thin film, that is in which the temperature rising rate of the crystalline portion and that of the amorphous portion are balanced relative to each other to correct the distortion of the mark shape, that is the technique of controlling the rate of absorption to correct the distortion of the mark shape.

This technique has, however, a drawback that the degree of freedom in optical designing, such as rate of absorption or reflectance, is lowered, and that the durability against repeated overwriting is not that high.

Moreover, in the short wavelength conditions, the time during which the temperature higher than the crystallization temperature is maintained becomes shorter, with the result that the basic erasure capability, such as erasure ratio by the dc light, which is an indispensable condition for producing the effect of controlling the rate of absorption, falls short.

SUMMARY OF THE INVENTION

It is therefore an object of the present invention to provide an optical recording medium which is able to cope with high recording density and a high transfer rate corresponding to the shortened wavelength and which is able to realize optimum direct overwrite without lowering the repetitive durability or storage stability of recorded signals.

The present invention provides an optical recording medium including a recording layer formed at least of a phase change material, with the wavelength of the recording and/or reproducing laser light being 380 to 420 nm, wherein a ratio $Ac/Aa$, where $Ac$ is the absorption rate of said recording layer in a crystalline state and $Aa$ is the absorption rate of said recording layer in an amorphous state, is not less than 0.9, and wherein a crystallization promoting layer promoting the crystallization of said phase change material is contacted with at least one surface of said recording layer.

The basic concept of the present invention is to use absorption rate control and crystallization promotion in combination. By such combination, it is possible to positively compensate the difference between the physical properties of the crystal phase and those of the amorphous phase to realize optimum direct overwrite.

The individual techniques, that is the absorption rate control and crystallization promotion; can be suppressed so that these problems are not apparent, such that repetitive durability or storage stability of the recorded signals is not impaired.

The absorption rate control and crystallization promotion represent techniques contradictory for the layer of the phase change material, such that, if these are combined together, it may be feared that the merits of the two techniques cancel each other. For this reason, attempts in combining these two techniques have scarcely been made in the prior art.

The present inventors have found that a problem arises that absorption rate control fails to lead to the lowered jitter value even with absorption rate control such that some measured need to be taken to combat this problem.

The present inventors have investigated into the combination of the absorption rate control and crystallization promotion and have arrived at the information that the shortcomings of the respective techniques are hardly manifested subject to appropriate designing.

That is, the absorption rate control lowers the absorption of the recording film by a layered film structure, as a result of which the erasure sensitivity is lowered, even if the recording medium is superior in repetitive reproduction and durability.

Conversely, if high-speed crystallization is enabled by the provision of the crystallization promoting layer, the repetitive reproduction and durability are not optimum, even if erasure sensitivity is improved.

If the two techniques are combined together, recording marks are erased when desired, thus enabling high-speed overwrite. On the contrary, the recording marks are not erased when it is not desired to erase the marks. For example, the cross-write characteristics are improved to optimize the storage stability, while the rise in the jitter value accompanying the increased number of times of playback is only small.

This finding has not been premeditated in the past, and has been first reached by the present inventors.

According to the present invention, high speed or high transfer rate and large capacity, as two major factors required in achieving high performance of the optical disc, may be realized, whilst the high reliability, which is in a relation of trade-off with respect to the high speed of the optical disc, can be achieved simultaneously.

That is, the present invention provides a technique of realizing the high performance and high reliability in a well-balanced manner and hence a technology which is indispensable for laser wavelength shortening, multi-layering of the optical disc, realization of a finer spot size or near-field recording with a phase change recording medium.

DESCRIPTION OF THE PREFERRED EMBODIMENTS

Figure 1:
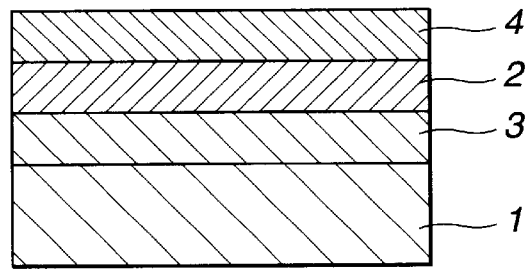
FIG. 1 is a schematic cross-sectional view showing essential portions of a basic illustrative structure of an optical disc embodying the present invention.

Referring to the drawings, an optical recording medium (optical disc) according to the present invention will be explained in detail.

FIG. 1 shows a basic structure of an optical disc embodying the present invention. On a transparent substrate 1, with a thickness not less than 0.3 mm, there is formed a recording layer 2. In contact with both surfaces of the recording layer 2 are formed crystallization promoting layers 3, 4.

Only one crystallization promoting layer may be formed on one or the other surface of the recording layer 2.

In a phase change optical recording medium, the ratio Ac/Aa, where Ac is the absorption rate of a recording layer 2 when the recording layer is in the crystalline state and Aa is the absorption rate of a recording layer 2 when the recording layer is in the amorphous state, is routinely on the order of 0.8.

According to the present invention, the ratio Ac/Aa, where Ac is the absorption rate of a recording layer 2 when the recording layer is in the crystalline state and Aa is the absorption rate of a recording layer 2 when the recording layer is in the amorphous state, is set, by proper film designing, to not less than 0.9, for the wavelength of the recording and/or reproducing laser light, hereinafter the same. In particular, the absorption rate Aa when the recording layer is in the amorphous state is preferably not less than 60%.

By setting the absorption rate ratio Ac/Aa to not less than 0.9, the crystalline portion tends to be heated more easily, relatively, such that the size of the recording mark written in a portion of the blank crystalline state can be made to approach to the size of the recording mark overwritten on the recording mark in the amorphous state.

However, if the ratio Ac/Aa is increased excessively, the possibility is high that the direction in which the ratio is increased affects the reflectivity designing or thermal designing to deteriorate the comprehensive balance of the optical recording medium.

This naturally sets a range of allowance, that is an upper limit, of the aforementioned absorption rate ratio. However, this range of allowance also differs with the wavelength of the recording and/or reproducing light, such that, with the wavelength ranging between 380 nm and 420 nm, the absorption rate ratio is preferably set to not larger than 2.5.

Meanwhile, the absorption rate ratio Ac for the crystalline state of the recording layer is the absorption rate ratio in the recording layer in the crystalline state with respect to the wavelength of the recording and/or reproducing laser light. Similarly, the absorption rate ratio Aa for the amorphous state of the recording layer is the absorption rate ratio in the recording layer in the amorphous state.

These values cannot be measured directly in a multi-layered structure. It is necessary to calculate the intensity of light absorbed in the recording layer as result of multi-path interference by the multiple layers and to divide the calculated light intensity with the incident light intensity.

Figure 2:
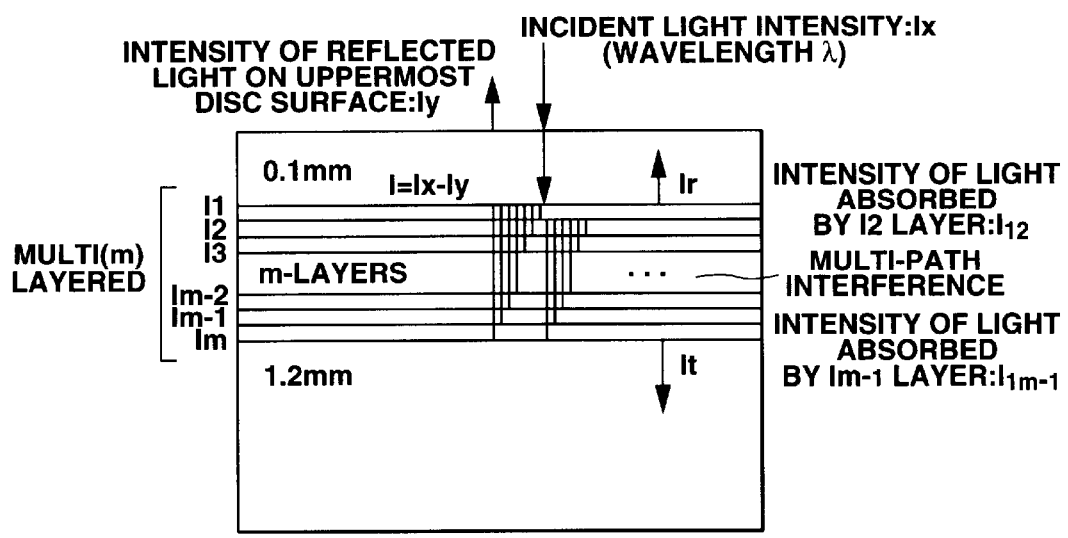
FIG. 2 is a diagrammatic view for defining the reflectance, transmittance and the absorption rate in a multi-layer film.
Figure 3:
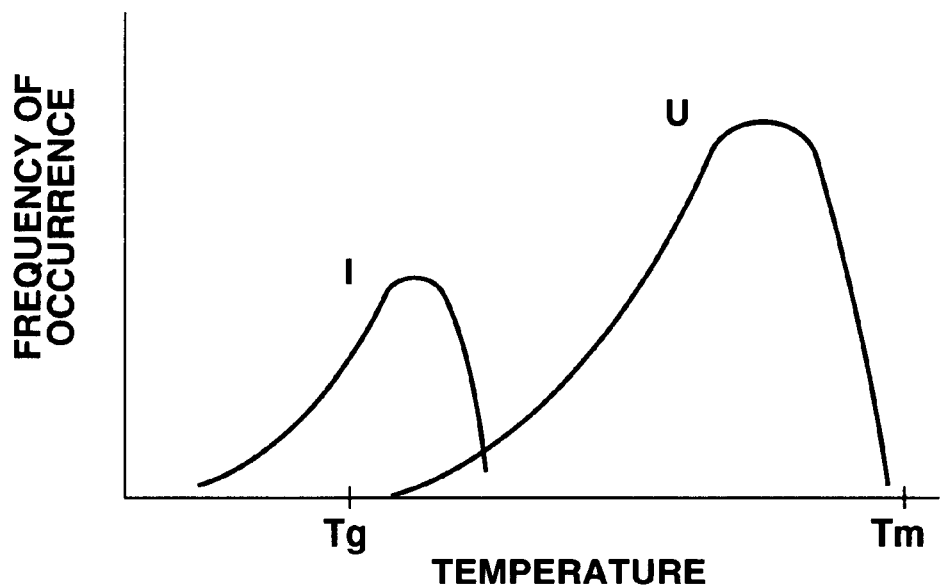
FIG. 3 is a graph showing temperature dependency of the nucleation speed and the crystal growth speed.

Thus, according to the present invention, the absorption rates Ac, Aa as follows:

In the case of the multi-layer film (m layer) shown in FIG. 2, the reflectance R the transmittance T and the absorption rate ratio of the disc, the absorption rate ratio $A_{12}$ in the $I_2$ layer, such as a recording layer and the absorption rate ratio $A_{Im-1}$ in the $I_{m-1}$ layer, such as the recording layer, are defined as follows:

reflectance R of the disc: $100 \times Ir/I$ (%)

transmittance T of the disc: $100 \times It/I$ (%)

absorption rate ratio A of the disc: $100 \times (I-Ir-It)/I$ (%)

absorption rate A12 in the I2 layer (e.g., recording layer): $100 \times I_2/I$ (%)

absorption rate $A_{Im-1}$ in the $I_{Im-1}$ layer (e.g., reflecting layer): $100 \times I_{Im-1}/I$ (5)

it being assumed that the light incidence occurs only in the perpendicular direction, with the oblique incident component being disregarded, and that the respective interfaces are planar, with the effect of micro-irregularities of the groove etc being disregarded, and that only multi-path interference on the multi-layer film being taken into account, with the reference incident light intensity I being the actual incidfent light intensity Ix less the intensity of the reflected light Iy on the surface.

In the above definition, Ir is the intensity of the reflected light from the multi-layer film, It is the intensity of light transmitted through the multi-layer film, $I_{12}$ is the intensity of light absorbed by the I2 layer, such as the recording layer and $I_{Im-1}$ is the intensity of light absorbed by the $I_{m-1}$ layer, such as a reflective layer.

The absorption rate ratio Ac or Aa is the intensity of light absorbed by the recording layer in the crystalline or amorphous state as a result of multi-path interference divided by the intensity of the incident light I to the multiple films.

The above calculations of the multi-path interference are possible by introducing the characteristic matrix if the laser light wavelength, film thicknesses of the respective layers and complex refractive index (n−1k) are known.

There are a number of publications issued concerning the methods for calculating the multi-path interference, such as, for example, Tatsuo Tsuruta, "Applied Optics I" (1-2-2: Light Intensity), "Applied Optics II" (4-3-2: Multi-Layer Film) issued by Baifukan Publishing Company Ltd., and Shiro Fujiwara (editor), Optical Technical Series II "Optical Thin Film" (Capter 3, Multi-layer Film and four-Terminal Circuit), issued by Kyoritsu Publishing Company Ltd.

As may be seen from these publications, the relation between the tangential component of the electrical and magnetic fields on the Jth boundary and those on the (J-1)st boundary can be known.

The light energy I can be represented by an average value $<|S|>$ of the absolute values of the pointing vector S, whilst the absorption AJ and the absorption rate ratio of the J'th layer can be represented by $A_j=I_{j-1}-I_j$ and by $(I_{j-1}-I_j)/I_0$, where $I_0$ is the incident light energy after subtraction of surface reflection), respectively.

The algorithm for these calculations are well-known, such that these calculations can be made by employing the algorithms. The expression "only so-and-so in a monolayer" means the case for m=1.

The operation of the crystallization promoting layers 3, 4 is hereinafter explained.

In general, the crystallization of the amorphous phase proceeds in two stages, namely in the nucleation stage and in the crystal growth stage. If assumed that the generation of crystal nuclei occurs at random in all sites in the interior of the amorphous phase, the nucleation speed is increased with rise in temperature to reach the maximum value at a temperature slightly above the glass transition temperature Tg, with the nucleation speed rapidly decreasing at temperatures higher than the temperature slightly above the glass transition temperature. On the other hand, the growth speed U becomes maximum at a temperature close to the melting point Tm.

In the case of the amorphous mark of the optical disc, in which the layer of the recording material 3 has two surfaces, in contradistinction to the above-mentioned supposition, nucleation is likely to take place on the boundary surfaces between a layer of the recording material 3 and layers on its both sides. In this case, the chemical or physical properties of the boundary surfaces are known to affect the frequency of the nucleation appreciably.

Thus, according to the present invention, the crystallization promoting layers 3, 4 are provided adjacent to the recording layer 2 to control the generation frequency of the crystal nuclei. It is noted that only one of the layers 3, 4 suffices. That is, by providing the crystallization promoting layers 3, 4 adjacent to the recording layer 2, it is possible to promote the growth of crystal nuclei to raise the speed of crystallization. This leads to a sufficient overwrite erasure ratio, even under high transfer rate condition, thus assuring satisfactory jitter values.

It is noted that the crystallization promoting layers 3, 4 may be the same layer operating simultaneously as the dielectric layers. For example, ZnS—SiO$_2$, in particular having a molar ratio of approximately 4:1, may be used as an ordinary dielectric layer, or the dielectric material itself may be formed of a crystallization promoting material. That is, if the crystallization promoting layer formed of a crystallization promoting material, enumerated below, is provided adjacent to the recording layer 2, it does not matter whether or not there is provided the dielectric layer or what sort of the material is used for the dielectric layer. It has also been known that, if the crystallization promoting layer is provided adjacent to at least one of the surfaces of the recording layer 2, the nucleation speed of the recording layer 2 is higher than if there lacks the crystallization promoting layer. It is however noted that the crystallization promoting effect achieved is higher if the crystallization promoting layers are provided adjacent to both surfaces of the recording layer 2.

As the materials capable of promoting the crystallization, it has been known that the materials used hitherto as a dielectric material in the optical recording medium, excluding sulfides, and having the value of the extinction coefficient k for the wavelength of the recording and/or reproducing laser of 0.3 or less, may be used satisfactorily. The crystallization promoting layer may be formed exclusively or mainly of nitrides, oxides, carbides, fluorides, nitro-oxides, nitro-carbides or oxocarbides of metal or metalloids, such as Al, Si, Ta, Ti, Zr, Nb, Mg, B, Zn, Pb, Ca, La or Ge. Specifically, layers constituted exclusively or mainly by AlNx, where $0.5 \leq x \leq 1$, in particular AlN, $Al_2O_{3-x}$, where $0 \leq x \leq 1$, in particular $Al_2O_3$, $Si_3N_{4-x}$, where $0 \leq x \leq 1$, in particular $Si_3N_4$, $SiO_x$, where $1 \leq x \leq 2$, in particular $SiO_2$, SiO, MgO, $Y_2O_3$, $MgAl_2O_4$, $TiO_x$, where $1 \leq x \leq 2$, in particular $TiO_2$, $BaTiO_3$, $SrTiO_3$, $Ta_2O_{5-x}$, where $0 \leq x \leq 1$, in particular $Ta_2O_5$, $GaO_x$, where $1 \leq x \leq 2$, SiC, Ga—N, Ga—N—O, Si—N—O, $CaF_2$, LaF, $MgF_2$, NaF, $ThF_4$, exhibit the function of promoting the crystallization. Also, layers formed of a mixture of the above materials, for example, a layer formed of AlN—SiO$_2$, similarly exhibits the function of promoting the crystallization.

However, these materials cannot be said to be sufficient in crystallization promoting functions, such that optimum signal characteristics cannot be achieved under severe conditions.

Thus, of the materials having the function of promoting the crystallization, one or more of Si—C, Si—C—O, Si—C—H, Si—C—H—O, Si—N, Si—N—O, Si—N—H, Si—N—H—O Si—C—N, Si—C—N—O, Si—C—N—H, Si—N—H—O, Si—O, Si—O—H, Al—N and Al—O, in particular, is preferably used as the crystallization promoting layer.

Examples of the materials include Si—C, $Si_3N_4$, $SiO_2$, AlN, $Al_2O_3$ and materials mainly composed of these compounds and containing oxygen, hydrogen or nitrogen.

It has been confirmed that these materials exhibit outstanding crystallization promoting effect, in combination with absorption rate ratio control (Ac/Aa$\geq$0.9), characteristic of the present invention, to give a large jitter value diminishing effect and improved repeated overwrite durability, as demonstrated in the Examples of the invention. In the configuration shown in an illustrative Example, such a material composed mainly of SiC and into which O or H was introduced was superior. Moreover, optimum characteristics were achieved in cross-write or mark preservation stability. On the other hand, the above materials were superior as a material contacting with the recording layer in that these materials were not susceptible to peeling or alloying on an interface with the recording layer and exhibited only low light absorption capability. The above accounts for the preferability of the above-mentioned crystallization promoting materials.

Although the film thickness of the crystallization promoting layer is not prescribed specifically, the film thickness of not less than 1 nm is desirable for forming a homogeneous film. For the configuration shown by the illustrative example, the film thickness not less than 2 nm demonstrated a jitter value diminishing effect.

Although there is no limitation to the manufacturing method for the crystallization promoting layer, several examples are given below:

First, SiC can be formed by a SiC target by an RF sputtering method, using an Ar gas.

$Si_3N_4$ can be formed by film forming by a reactive sputtering an Si target using an N2 gas $SiO_2$ can be formed by film deposition by RF sputtering a $SiO_2$ target using ab Ar gas.

AlN can be formed by reactive sputtering an Al target using an ArN$_2$ gas.

Al$_2$O$_3$ can be formed by reactive sputtering an Al target using e.g., an Al target.

Si—C—H—O can be formed by film forming by RF sputtering a SiC target using an Ar gas containing H$_2$O in an amount of e.g., 300 ppm.

By providing the crystallization promoting layers 3, 4, generation of crystal nuclei is promoted to raise the crystallization speed. This is extremely advantageous in direct overwriting.

However, if the cross-sectional speed is excessively high, the recording marked formed (amorphous marks) tend to be impaired in preservation stability. Conversely, if the crystallization speed is excessively low, the effect proper to the crystallization promoting layers 3, 4 cannot be expected to be displayed. In this consideration, the crystallization speed needs to be controlled to a moderate value.

The above is the basic configuration of the optical disc embodying the present invention. The layer structure can, however, be modified in desired manner.

Figure 4:
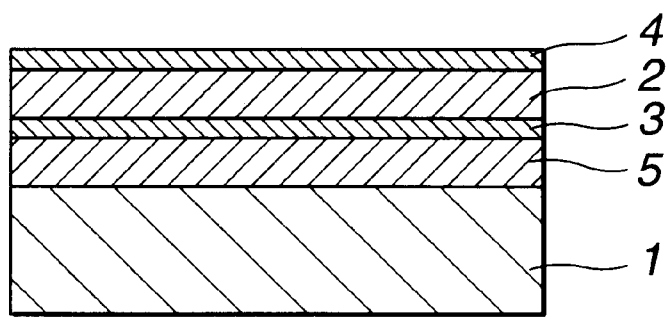
FIG. 4 is a schematic cross-sectional view showing an illustrative structure of an optical disc having a reflective layer.

FIG. 4 shows an example of forming the reflecting layer 5. In this case, the reflecting layer 5 and the recording layer are formed in this order on the substrate 1.

Thus, the recording and/or reproducing laser is illuminated from the side of the recording layer 2 for recording and/or reproduction. In this case, a light transmission protective layer 6 is preferably formed on the recording layer 2.

Figure 5:
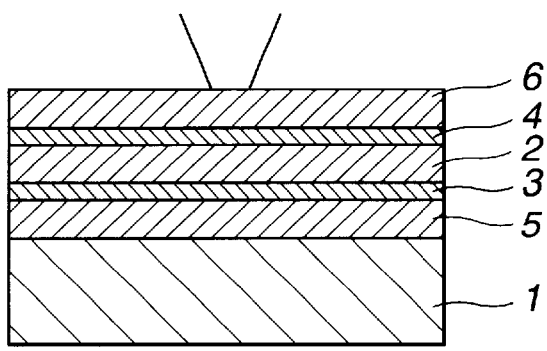
FIG. 5 is a schematic cross-sectional view showing an illustrative structure of an optical disc having a light transmission protective layer.

FIG. 5 shows an example of forming the light transmission protective layer. In the present example, the reflecting layer 5, recording layer 2 and the light transmission protective layer 6 are sequentially formed and crystallization promoting layers are formed adjacent to both sides of the recording layer 2.

Thus, in the present optical disc, the recording and/or reproducing light is illuminated from the side of the light transmission protective layer 6 for recording and/or reproduction for the recording layer 2.

The configuration of the optical disc is not limited to the above-described configurations. For example, the recording layer 2 and the reflecting layer 5 may be formed in this order on the transparent substrate 1 so that recording and/or reproduction will be performed from the side of the transparent substrate 1. However, if the recording and/or reproduction is performed from the side of the light transmission protection layer 6, the numerical aperture of the objective lens can be increased to achieve a high recording density as the skew margin is maintained, thus achieving an outstanding effect proper to the present invention. The reason is that, by reducing the size of the recording spot, the temperature on a given spot of the optical disc is changed in a short time so that direct overwriting is rendered more difficult in the same manner as when the linear speed is increased.

Figure 6:
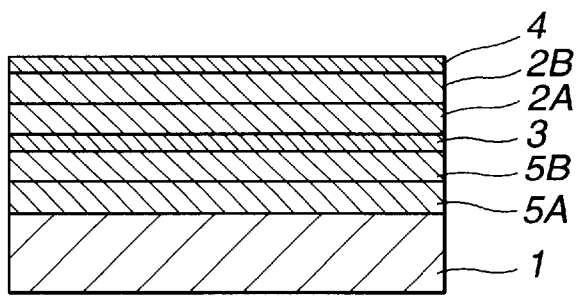
FIG. 6 is a schematic cross-sectional view showing an illustrative structure of an optical disc having multi-layered reflective and recording layers.

Alternatively, the recording layer may be constituted by a first recording layer 2A and a second recording layer 2B, as shown in FIG. 6. Moreover, the reflecting layer may be a double-layer film constituted by a first reflecting layer 5A and a second reflecting layer 5B. By constituting the reflecting layer in a multi-layer structure, such as double-layer structure, the degree of freedom in optical designing is increased. If the reflecting layer is constituted by two or more layers, different as to the material, composition or complex refractive index, a dielectric layer(s) may be inserted at optional positions between the reflecting layers. The number of layers of the dielectric layers inserted is also optional.

Figure 7:
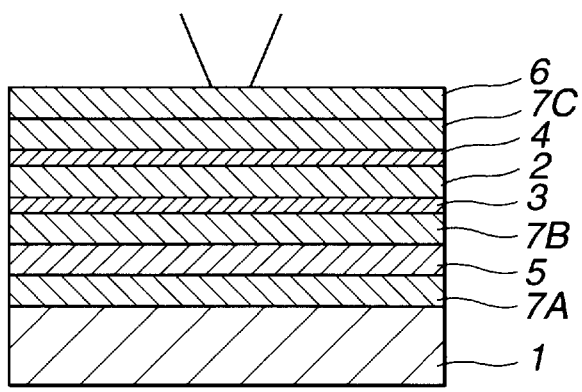
FIG. 7 is a schematic cross-sectional view showing an illustrative structure of an optical disc having dielectric layers between neighboring layers.

In addition, dielectric layers 7 may be arranged between the light transmission protective layer 6 and the recording layer 2, between the recording layer 2 and the reflecting layer 5 and between the reflecting layer 5 and the transparent substrate 1. The dielectric layers are arranged in this manner at least at one site. FIG. 7 shows an illustrative structure in which the dielectric layers 7 (7C, 7B, 7A) are arranged at all of the three sites.

By arranging these dielectric layers 7 and adjusting their film thicknesses, it becomes possible to control the optical properties to control the above-mentioned absorption rate ratio.

Figure 8:
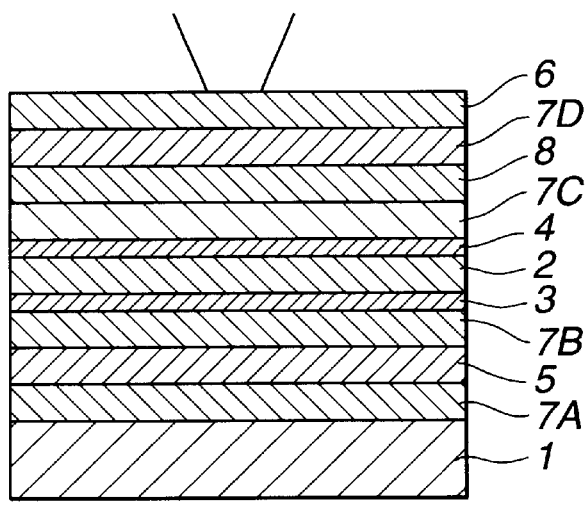
FIG. 8 is a schematic cross-sectional view showing an illustrative structure of an optical disc having a light absorption control layer.

The respective dielectric layers 7 may each be formed as a multi-layered film, e.g., a two-layered film. It is also possible to provide a light absorption controlling layer 8 at a site closer to the recording and/or reproducing light illuminating side than the recording layer 2, to control the absorption rate ratio, as shown in FIG. 8. It is similarly possible in this case to arrange the dielectric layers 7 (7D, 7C, 7B, 7A) at optional sites inclusive of the site between the light absorption controlling layer 8 and the light transmission protective layer 6 or the site between the light absorption controlling layer 8 and the recording layer 2.

The light absorption controlling layer 8 may similarly be constituted by two or more layers different as to the material type, composition or complex refractive index. In such case, a dielectric layer(s) may be inserted at optional positions between the reflecting layers. The number of layers of the dielectric layers inserted is also optional.

Of the above-mentioned configurations, the preferred configuration is such a one comprised of a reflecting layer, a first dielectric layer, a first crystallization promoting layer, a recording layer, a second crystallization promoting layer, a second dilectric layer and a light transmission protective layer, arranged sequentially on a substrate.

It is preferred in this case to set the thicknesses of the substrate, reflecting layer, first dielectric layer, first crystallization promoting layer, recording layer, second crystallization promoting layer, second dielectric layer and the light transmission protective layer to 1.0 to 1.2 mm, 5 to 200 nm, 5 to 70 nm, 1 to 20 nm, 5 to 25 nm, 1 to 20 nm and to 0.5 to 0.15 nm, with the second dielectric layer being a momo-layer or multi-layer film at least including a dielectric layer with a thickness of 5 to 100 nm.

In the optical disc of the above structure, the material used for the transparent substrate is preferably plastics materials, such as polycarbonate or acrylic resin, in view of cost. However, glass may also be used. For fabrication, an injection molding method, or a photopolymer (2P) method, employing a UV light curable resin, may be used. However, any other suitable method, which possibly gives a desired disc shape, e.g., a disc shape with a thickness of 1.1 mm and a diameter of 120 mm, and optically sufficient substrate surface smoothness, may be used.

Although there is no particular limitation to the substrate thickness, the thickness not less than 0.3 mm and not larger than 1.3 mm is particularly preferred. If the substrate thickness is smaller than 0.3 mm, disc strength tends to be lowered. Conversely, if the substrate thickness is thicker than 1.3 mm, the disc thickness is thicker than 1.2 mm of the CD or DVD, such that there is a possibility that the same disc tray cannot be used in commercializing a driving device adapted to cope with all of these discs.

If the laser light for recording and/or reproduction falls on the light transmission protective layer, the substrate material may be an opaque material, such as metal. Conversely, if the laser light falls on the substrate, such a material that scarcely exhibits absorption capability for the wavelength of the recording and/or reproducing laser light (380 to 420 nm) is used. At any rate, the substrate type may be optional.

Meanwhile, if the recording and/or reproducing light falls on the substrate, the forming sequence of the layers provided between the substrate and the light transmission protective layer is reversed from that when the recording and/or reproducing light falls on the light transmission protective layer.

The surface of the optical disc provided with the multi-layer recording film may be formed with inundated grooved tracks. The light beam is can be moved to an optional site on the disc with the groove as guide. The groove shape may be spiral or concentric or may be in the form of a pit string.

The light transmission protective layer is preferably formed of a material not having the absorption capability with respect to the wavelength of the recording and/or reproducing laser (380 nm to 420 nm). Specifically, the light transmission protective layer is formed of a material having a transmittance not less than 80%. The thickness of the light transmission protective layer is preferably not larger than 0.3 mm. In particular, a hitherto unprecedented high recording density can be achieved by combining the thickness ranging between 3 and 177 μm with a high numerical aperture NA, such as 0.85.

For preventing dust deposition or scratching on the surface of the light transmission protective layer, a protective layer formed of an organic or inorganic material may be formed, which preferably has only negligible absorption capability with respect to the wavelength of the recording and/or reproducing laser light.

The method for fabricating an optical disc for performing recording and/or reproduction from the side of the light transmission protective layer may roughly be classified into the following two methods:

The first method layers a multi-layered film on a substrate formed with a guide groove and ultimately forms a smooth light transmission protective layer. The second method, on the other hand, layers a multi-layered film on a light transmission protective layer formed with a guide groove, and ultimately forms a smooth substrate.

Since the process step of forming inundsations on the light transmission protective layer or the process step of forming a multi-layered film is not necessarily easy, the first method is more preferred in view of mass-producibility.

If the first method is used, such a method may be used in which an optically sufficiently smooth sheet (film), 0.3 mm in thickness, formed of a plastics material, such as polycarbonate or acrylic resin, is stuck on UV light irradiation, using a UV light curable resin as an adhesive. Such a method may be used in which a UV light curable resin is applied to a desired thickness not larger than 0.3 mm, by e.g., a spin coater, followed by UV light irradiation.

The light transmission protective layer may be of any suitable configuration or may be formed by any suitable method provided that it has the transmittance not less than 90% and a thickness not larger than 0.3 mm. The light transmission protective layer may also be formed with an inundated grooved track(s). The inundated grooved track(s) may also be formed in the light transmission protective layer by e.g., an injection molding method, a photopolymer (2P) method, or a method of transcribing inundations by pressure bonding or pressurization.

In the optical disc of each of the above configurations, the recording layer 2 is formed of a phase change material, that is, a material which undergoes reversible phase changes on illumination by a light beam. In particular, such a material which undergoes reversible phase changes on illumination of a light beam may be used. Any known suitable phase change materials, such as chalcogenic compounds or chalcogen as a sole material may be used.

Examples of these materials include such ones containing Te, Se, Ge—Sb—Te, Ge—Te, Sb—Te, In—Sb—Te, Ag—In—Sb—Te, Au—In—Sb—Te, Ge—Sb—Te—Pd, Ge—Sb—Te—Se, In—Sb—Se, Bi—Te, Bi—Se, Sb—Se, Sb—Te, Ge—Sb—Te—Bi, Ge—Sb—Te—Co or Ge—Sb—Te—Au, with or without gaseous additions, such as nitrogen or oxygen. Of these, such a material mainly composed of Ge—Sb—Te is most preferred. The above materials may also be added to with optional elements, such as Sb or Pd, or with gaseous elements, such as chlorine or oxygen.

If a Ge—Sb—Te material is used, such material having the composition $Ge_xSb_yTe_z$, where x, y, z in the composition denote atomic ratios of elements in question, in a range of $17 \leq x \leq 25$, $17 \leq y \leq 26$ and $45 \leq z \leq 65$, gives optimum characteristics.

These recording layers can be made to undergo reversible phase changes between the amorphous state and the crystalline state depending on the magnitude of the intensity of the light beam. The recording, reproducing, erasure, over-write or the like operations may be carried out by exploiting optical changes, such as those in reflectance, caused by status changes. In general, crystallization, generally termed initialization, is effected after film formation, followed by recording and/or reproduction.

Meanwhile, the recording layer may be constituted by two or more continuous layers different as to one or more of material type, composition or complex refractive index.

The reflecting layer is preferably formed of metals, metalloids, semiconductors, compounds or mixtures thereof, exhibiting reflective capability with respect to the wavelength of the recording and/or reproducing laser and thermal conductivity of 0.0004 J/cm·K·δ to 4.5 J/cm·K·δ. Basically, any suitable reflecting layer used in conventional optical discs may be used.

Examples of the materials of the reflecting layer include Al, Ag, Au, Ni, Cr, Ti, Pd, Co, Si, Te, W, Mo, Ge, either singly or as alloys mainly composed of these materials. Of these, Al-, Ag-, Au-, Si- or Ge-based materials are preferred in view of practical utility. The alloys may be enumerated by, for example, Al—Ti, Al—Cr, Al—Co, Al—Mg—Si, Ag—Pd—Cu, Ag—Pd—Ti and Si—B. These materials are selected in view of optical and thermal characteristics. In general, if the film thickness of the material is set to a value sufficient not to permit transmission of light therethrough, such as 50 nm or more, the reflectance is increased, while heat is liable to be dissipated. In particular, Al- or Ag-based materials are preferred in that these exhibit high reflectance not less than 80% in a short wavelength range, such as $\lambda=400$ nm. Also preferred are alloys, such as Al—Ti, Al—Cr, Al—Co, Al—Mg—Si, Ag—Pd—Cu and Ag—Pd—Ti.

If Ag is used, the sulfurizing reaction, such as reaction of $ZnS—SiO_2$ with S, is feared to take place, so that it is more preferred to alloy Ag or to introduce an S-free dielectric material as an intermediate layer.

In the present specification, such a configuration is used in which a portion of a light beam incident from the light transmission protective layer is transmitted through the reflecting layer, by way of an example of realizing absorption rate ratio control (Ao/Aa≧0.9). The reflecting layer used in this case is specifically termed a transmission type reflecting layer. As another example, there is applied a configuration in which a layer termed an absorption control layer is provided at an optional position between a light transmission protective layer and a crystallization promoting layer neighboring to the light transmission protective layer of the recording layer, as will be explained subsequently.

In the former configuration, employing the transmission reflecting layer, the material type and the configuration for the reflecting layer are limited to a narrower range. In the latter configuration, employing the light absorption control layer, and other configurations, such as a configuration having multi-layered dielectric layers, any optional reflecting layer may be used provided that it satisfies the aforementioned condition, that is the condition that the reflecting layer is formed of metals, metalloids, semiconductors, compounds or mixtures thereof, exhibiting reflective capability with respect to the wavelength of the recording and/or reproducing laser of 380 nm to 420 nm and thermal conductivity of 0.004 J/cm·K·δ to 4.5 J/cm·K·δ. The transmission reflecting layer is preferably such a material that not only satisfies the definition of the reflecting layer that the reflecting layer is formed of metals, metalloids, semiconductors, compounds or mixtures thereof, exhibiting reflective capability with respect to the wavelength of the recording and/or reproducing laser of 380 nm to 420 nm and exhibiting thermal conductivity of 0.004 J/cm·K·δ to 4.5 J/cm·K·δ, but also has the transmittance of the reflecting layer by itself of not less than 10% or has the transmittance of the disc employing this reflecting layer of not less than 1%. If the transmittance is lower than this value, no marked absorption rate ratio controlling effect can be achieved. As an example, Si, Au or Ge, by itself, or compounds or mixtures thereof containing these as main components, may be used.

It is noted however that Al, Ag, Ni, Cr, Ti, Pd, Co, Ta, W or Mo may be used provided that the layer thickness is not more than 10 nm. The transmission reflecting layer may also be formed of a mixture of the above-mentioned metals such as Au or metalloids with dielectric materials.

However, although the configuration employing the transmission reflecting layer is particularly desirable for the laser light in the vicinity of the wavelength of 640 nm, the value of a high Ac/Aa value is not necessarily obtained for the short wavelength laser having the wavelength of 380 nm to 420 nm.

Thus, for the short wavelength laser, with the wavelength of 380 to 420 nm, Al or Ag-based material having high reflectance is particularly preferred.

Meanwhile, the reflecting layer may be constituted by two or more layers different as to at least one of the material type, composition and complex refractive index. These layers may be provided consecutively or with the interposition of a dielectric layer(s).

The material used for the dielectric layers 7 is preferably devoid of absorption capability with respect to the wavelength of the recording and/or reproducing laser. Specifically, such a material having the value of the extinction coefficients k of not larger than 0.3 is preferred. Such material may be enumerated by, for example, a ZnS—SiO$_2$ mixture, having, in particular, a molar ratio of approximately 4:1. In addition, materials other than the ZnS—SiO$_2$ mixture, used up to now for the optical recording medium, may be used for the dilelectric layer.

For example, layers composed of nitrides, oxides, carbides, fluorides, sulfides, nitro-oxidesm nitr-carbides, or oxo-carbides of metals and metalloids, such as Al, Si, Ta, Ti, Zr, Nb, Mg, B, Zn, Pb, Ca, La or Ge, and layers mainly composed of these compounds, may be used. Specific examples include AlN$_x$(0.5≦x≦1), in particular AlN, Al$_2$O$_{3-x}$, where 0≦x≦1, in particular Al$_2$O$_3$, Si$_3$N$_{4-x}$, where 0≦x≦1, in particular Si$_3$N$_4$, SiO$_x$, where 1≦x≦2, in particular SiO$_2$, SiO, MgO, Y$_2$O$_3$, MgAl$_2$O$_4$, TiO$_x$, where 1≦x≦2, in particular TiO$_2$, BaTiO$_3$, StTiO$_3$, Ta$_2$O$_{6-x}$, where 0≦x≦1, in particular Ta$_2$O$_5$, G$_6$O$_x$, where 1≦x≦2, SiC, ZnS, PbS, Ge—N, Ge—N—O, Si—N—O, CaF$_2$, LaF, MgF$_2$, NaF, ThF$_4$. Alternatively, mixtures of these materials, for example, layers of AlN—SiO$_2$, may be used as dielectric layers.

Meanwhile, the dielectric layer may be constituted by two or more consecutive layers different as to at least material typews, composition or complex refractive index.

If the dielectric layer is constituted by two or more consecutive layers, it is more desirable from optical designing that the difference in the refractive index n of two neighboring dielectric layers be of a larger magnitude. It is noted that the optical designing parameters includes relative ease with which the Ac/Aa ratio is raised, and that the complex refractive index for the recording and/or reproducing laser is n−1k. In particular, the refractive index difference is desirably not less than 0.2. If, with the routinely used ZnS—SiO$_2$, with the molar ratio of 4:1, for example, the absorption rate ratio Ac/Aa can be raised easily by setting materials such as SiO$_2$, Light interference film, MgF$_2$, CaF$_2$, NaF, ZnS or TiO$_2$ in a neighboring relation to one another. For a conl comprised of three or more consecutive layers, these three layers may all be different as to at least one of the material type, composition or complex refractive index. Alternatively, the same layer may be inserted twice or more, as in the case of ZnS—SiO$_2$/SiO$_2$/ZnS—SiO$_2$. At any rate, the number of layers may be arbitrary, provided that neighboring layers are of materials different with respect to at least one of the material type, composition or complex refractive index. The larger the number of layers, the higher becomes the degree of freedom in optical designing, and hence the easier it becomes to raise the Ac/Aa ratio. Although the site of the multi-layer dielectric layer may be any site shown, the optical effect is maximum if the multi-layer dielectric layer is set between the light transmission protective layer and the reflecting layer.

As explained in connection with the reflecting layer, a layer termed a light absorption controlling layer is set in the present specification at an optional position between the light transmission protective layer and the recording layer having the crystallization promoting layer. The light absorption controlling layer is comprised of metal elements, metalloid elements or semiconductors, exhibiting the absorption capability for the wavelength of the recording and/or reproducing laser, or compounds or mixtures thereof. It is noted that the transmittance of the light absorption controlling layer by itself is not less than 3%. In particular, the effect of the absorption rate control becomes higher if the absorption rate of the light absorption controlling layer by itself is not less than 3% and the transmittance of the light absorption controlling layer by itself is not less than 20%. If the absorption rate of the sole layer is lower than 3%, the recording and erasing sensitivity is lowered. For the light absorption controlling layer, Al, Ag, Au, Ni, Cr, Ti, Pd, Co, Si, Ta, W, Mo or Ge by itself or alloys mainly composed of these elements may be used. Of these, Au, Al, Ag, Si or Ge by itself, compounds or alloys composed mainly of these elements are desirable in view of practical utility. If Au, Al or Ag is used, the film thickness is desirably set to 3 to 30 nm from optical considerations.

Other materials, such as Ni, Cr, Ti, Pd, Co, Ta, W or Mo may be used provided that the film thickness is set to, for example, not larger than 15 nm. If, for example, a mixture of the above-mentioned metals or metalloids with dielectric materials is used, the transmittance is higher than if Au by itself is used, thus enabling designing of increasing the thickness of the film thickness and increasing the degree of freedom in film thickness setting. The mixing ratio in this case can be suitably adjusted with the optical constant and thermal conduictivity as designing parameters. The dielectric material used may be selected optionally.

For example, the light absorption controlling layer may be constituted by a mixture of a material composed mainly of Au, Al, Ag, Si or Ge, and a ZnS—$SiO_2$ mixture, with the molar ratio of the two components of the mixture being approximately 4:1.

Meanwhile, the light absorption controlling layer may be constituted by two or more consecutive layers which are different with respect to at least one of the material type, composition or complex refractive index. These layers may be consecutive to one another or arranged with the interposition of a dielectric layer(s). For recording and/or reproducing the optical recording medium, having the above-mentioned structure, the short wavelength laser, with the wavelength of 380 nm to 420 nm, or a so-called blue laser or a blue purple laser, is used as the recording and/or reproducing laser. The light source for this recording and/or reproducing laser may be any suitable light source provided that it can emit the laser of the wavelength in question. Examples of the light source include a semiconductor laser and a gas laser. Alternatively, a so-called SHG laser, employing the second harmonics generating element, may be used.

EXAMPLES

The present invention will now be explained with reference to specific Examples based on experimental results.

Investigations for Coping with the Tendency Towards Shorter Wavelength

Example 1

Figure 9:
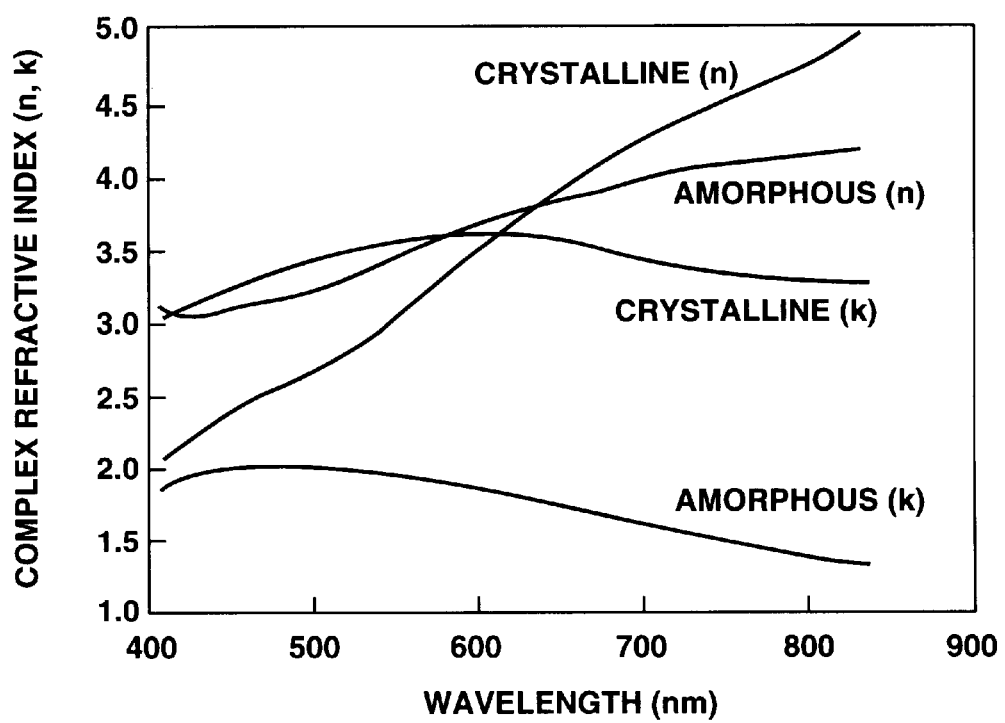
FIG. 9 is a graph showing changes in optical constants of the recording layers with the recording and/or reproducing wavelengths.

Usually, the optical constant of the recording layer is appreciably changed with the wavelength of the recording and/or reproducing light. FIG. 9 shows the wavelength dependency of the optical constant of $Ge_2Sb_2Te_5$. Here, a sample obtained on forming a film of $Ge_2Sb_2Te_5$ to a film thickness of not less than 100 nm on a silicon wafer was measured using a spectrometer. For example, the optical constants n, k for the wavelength of 640 nm are (3.72, 3.52) and (3.05, 1.90) for the crystalline state and for the amorphous state, respectively, while those for the wavelength of 407 nm are (2.05, 3.00) and (3.05, 1.90) for the crystalline state and for the amorphous state, respectively.

Figure 10:
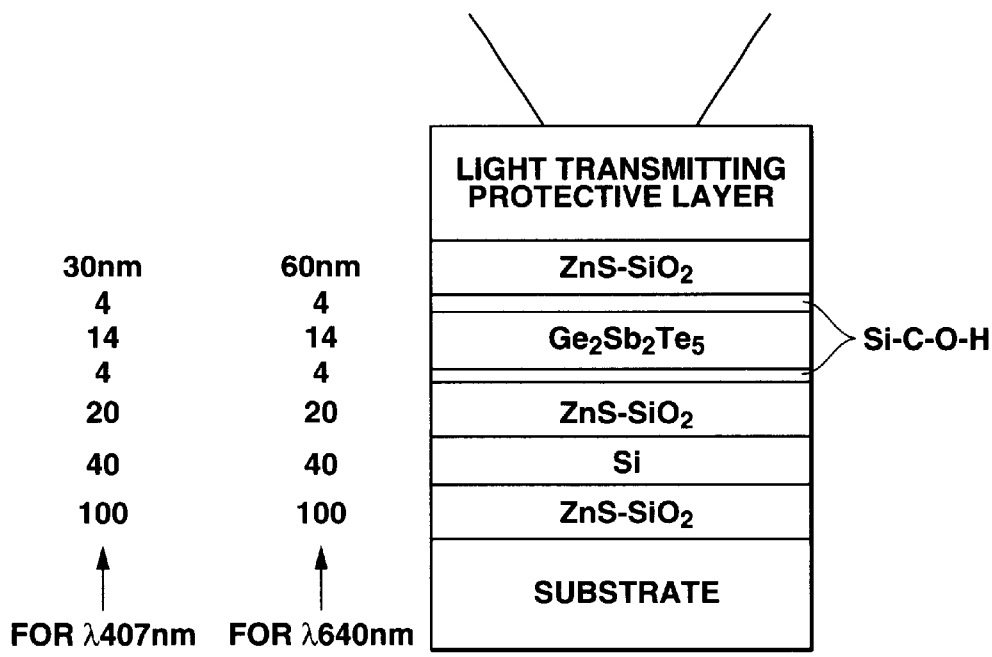
FIG. 10 is a diagrammatic view showing an illustrative optical disc employing a transmission type reflective layer.

Therefore, if the film structure suitable for the wavelength of 640 nm, as shown in FIG. 10, is employed, the results are not necessarily optimum for the wavelength of 407 nm. Here, the thickness of the dielectric material was adjusted with respect to the difference in wavelength, that is the thickness was set to 60 nm and 30 nm for the wavelengths of 640 nm and 407 nm, such as to equate the reflectance Rc at the time of crystallization.

Figure 11:
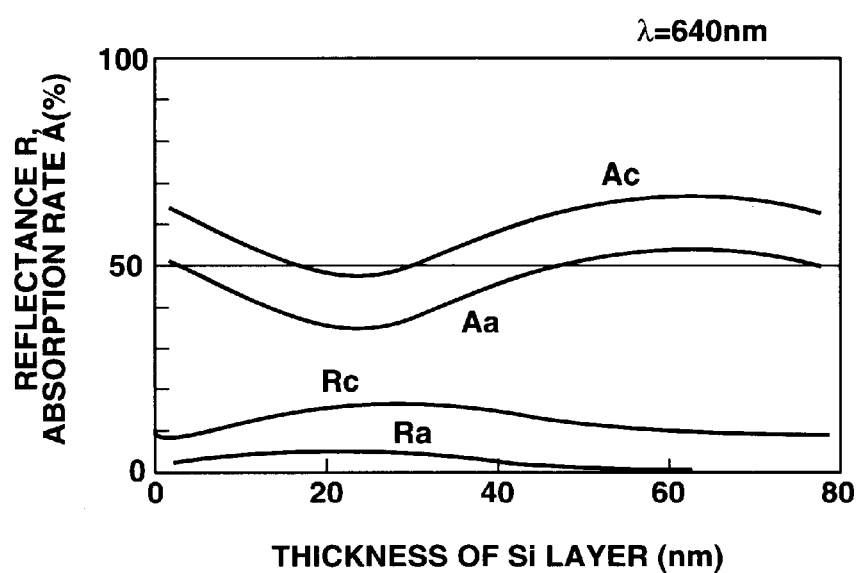
FIG. 11 is a graph showing changes in Ac, Aa, Rc and Ra of a recording layer at a wavelength of 640 nm.
Figure 12:
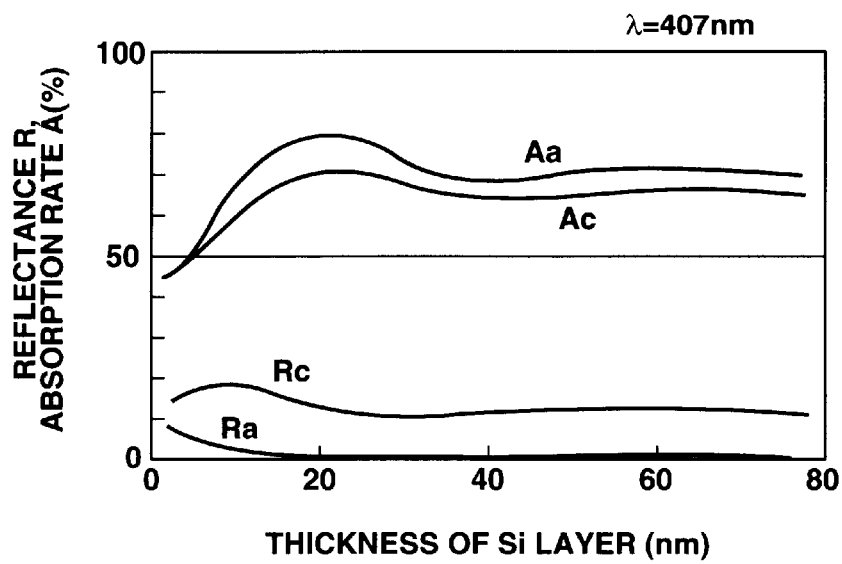
FIG. 12 is a graph showing changes in Ac, Aa, Rc and Ra of a recording layer at a wavelength of 407 nm.

FIG. 11 shows the relation between the Si film thickness and Ac, Aa for the wavelength of 640 nm. For this wavelength, the ratio of Ac/Aa=1.24 for the Si film thickness of 40 nm is achieved.

However, with this type of the disc configuration, Ac and Aa is reversed for the wavelength of 407 nm, such that, even though the Ac/Aa ratio for the Si film thickness is approximately 0.93 so that the ratio is not less than 0.8, it is difficult with this structure to achieve the Ac/Aa ratio of not less than 1.2 for the wavelength of 407 nm.

For the short wavelength range of 380 nm to 420 nm, the spot diameter is diminished, as explained with reference to FIG. 22, such that, even with the same linear speed, the time during which the temperature is maintained at a value not lower than the crystallixation temperature becomes shorter to render crystallization difficult. It is desirable, if possible, to achieve the Ac/Aa ratio not less than 1.2. Therefore, this configuration is not necessarily desirable.

Figure 13:
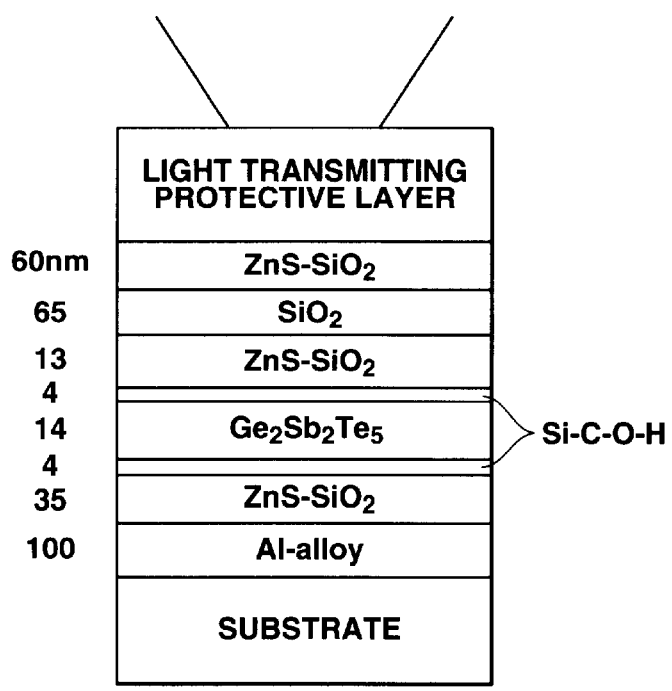
FIG. 13 is a diagrammatic view of an optical disc of Example 1.
Figure 14:
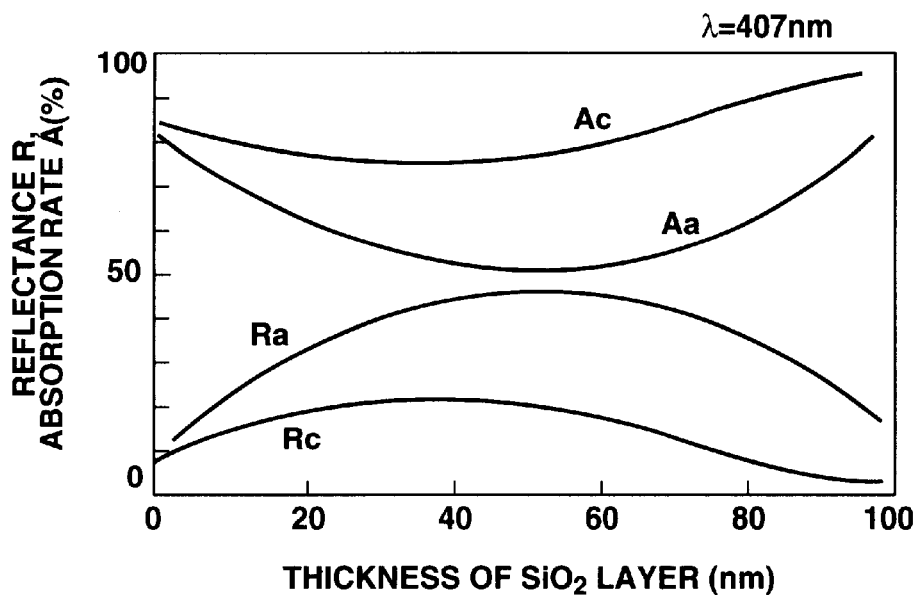
FIG. 14 is a graph showing changes in Ac, Aa, Rc and Ra of a recording layer at a wavelength of 407 nm.
Figure 15:
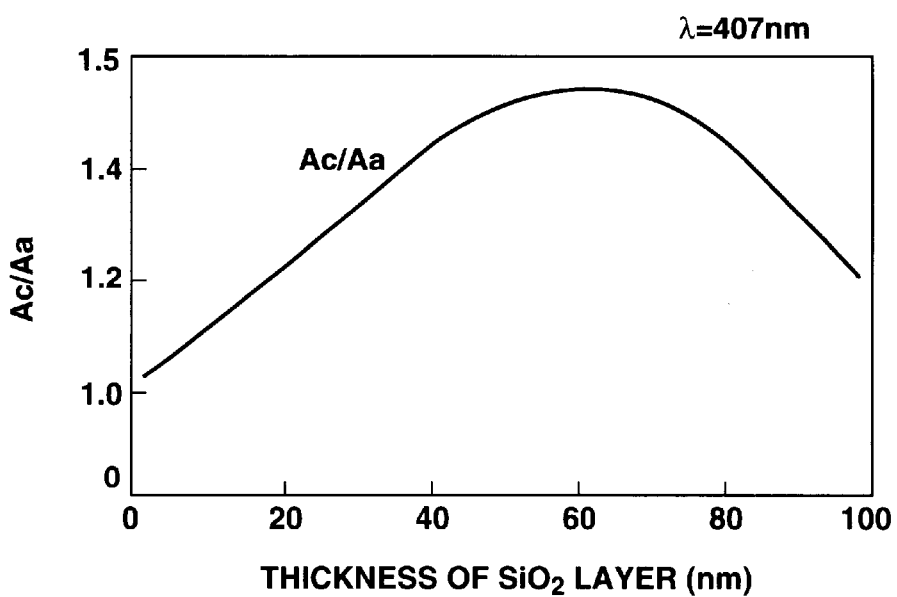
FIG. 15 is a graph showing changes in Ac?Aa at a wavelength of 407 nm.

Thus, the film structure shown in FIG. 13 has now been decided to be used. By so doing, the difference between Ac and Aa becomes larger to enable the Ac/Aa ratio to be set to not less than 1.5, here 1.53.

Meanwhile, the values of the complex refractive index (n–ik), corresponding to the wavelength $\lambda$=407 nm of the respective materials, used for calculations, where n is the refractive index and k is the extinction coefficient, are as follows:

polycarbonate substrate: n=1.75
polycarbonate sheet: n=1.75
ZnS—$SiO_2$: n=2.35
$SiO_2$: n=1.5.
SiC—H—O: n=1.9
Si: n=5.2, k=1.7
$Ga_2Sb_2Te_6$ (crystalline): n=2.05, k=3.00
$Ge_2Sb_2Te_6$ (amorphous): n=3.05, k=1.90
Al alloy: n=0.5, k=4.2
Au: n=2.1, k=2.6 (used for other examples)
Ag: n=0.16, k=2.05 (used for other examples)
ZnS: n=2.4 (used for other examples)

On the other hand, the complex refractive indices (n–ik), corresponding to the wavelength $\lambda$ of the respective materials used in the calculations=640 nm (n=refractive index, k=extinction coefficient), are as follows:

polycarbonate substrate: n=1.58
polycarbonate sheet: n=1.58
ZnS—$SiO_2$: n=2.13
SiC—H—O: n=1.9
Si: n=3.86, k=0.34
$Ga_2Sb_2Te_6$ (crystalline): n=3.72, k=3.52
$Ge_2Sb_2Te_6$ (amorphous): n=3.70, k=1.73

Of this sample, the recording and/or reproducing characteristics were checked. Measurements were made of the following items:

Items of Evaluation (1) Changes in the Jitter Value with the Number of Times of Direct Overrwriting (DOW)

The evaluation conditions for measurement of the above-mentioned evaluation items are as follows:

laser wavelength: 407 nm (crypton gas laser)
NA of objective lens (two-set lens): 0.85
(1, 7) demodulation
channel clocks: 50 MHz, 55 MHz
density: 0.135 $\mu$m/bit
track pitch: 0.33 $\mu$m (land groove recording)
land/groove definition: recessed and convexed sides relative to the recording and/or reproducing light are lands and grooves, respectively (data corresponds to groove unless specified).

Figure 16:
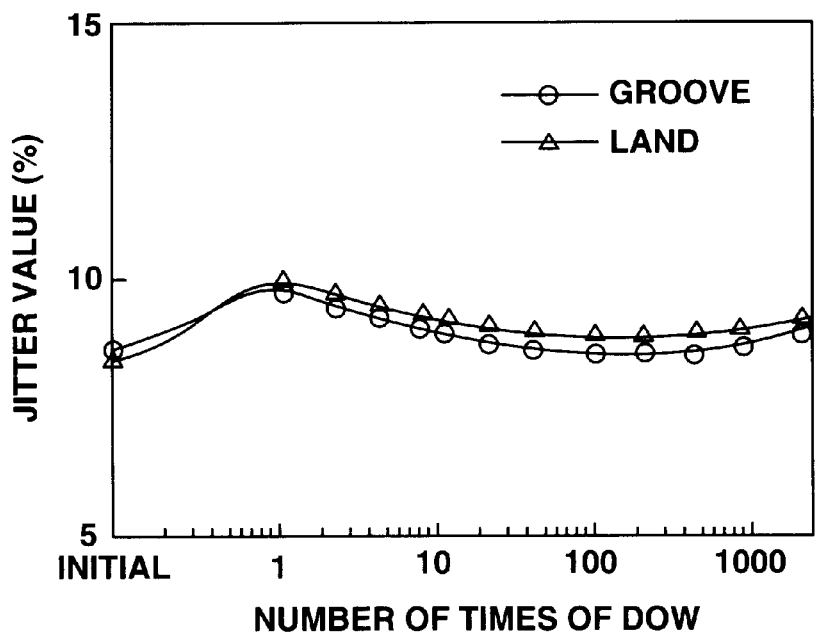
FIG. 16 is a graph showing changes in the jitter value with the number of times of direct overwrite operations.

FIG. 16 shows the results of evaluation. The jitter values were not higher than 10% even after 1000 times of DOW.

Conversely, with the Si reflecting film type, shown in FIG. 10, the jitter value exceeded 10% after 1000 times of DOW.

OTHER EXAMPLES

Example 2

Figure 17:
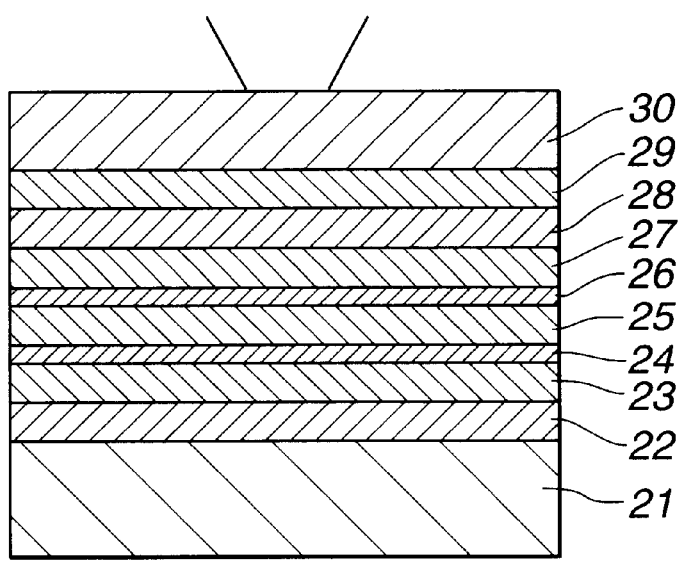
FIG. 17 is a schematic cross-sectional view showing an illustrative structure of an optical disc manufactured according to an alternative embodiment.

In the present Example, an optical disc configured as shown in FIG. 17 was prepared. This optical disc is comprised of a transparent substrate 21, on which are deposited a reflecting layer 22, a first dielectric layer 23, a crystallization promoting layer 24, a recording layer 25, a second dielectric layer 27, a third dielectric layer 28, a fourth dielectric layer 29 and a light transmission protective layer 30. The materials and thicknesses of the respective layers are as follows:

- transparent substrate 21: grooved polycarbonate substrate (1.2 mm in thickness)
- reflecting layer 22: Al alloy (165 nm in thickness)
- recording layer 25: $Ge_2Sb_2Te_5$ (14 nm in thickness)
- light transmission protective layer 30: UV light curable resin (0.1 mm in thickness)
- crystallization promoting layers 24, 26: SiC—H—O (4 nm in thickness)
- first dielectric layer 23: ZnS—$SiO_2$ (35 nm in thickness)
- second dielectric layer 27: ZnS—$SiO_2$ (13 nm in thickness)
- third dielectric layer 28: $SiO_2$ (65 nm in thickness)
- fourth dielectric layer 29: ZnS—$SiO_2$ (60 nm in thickness)

In the present configuration, only the light transmission protective layer has been changed from the polycarbonate sheet of Example 1 to the UV light curable resin.

The calculated value of the Ac/Aa ratio of the present optical disc was 1.53.

Similar evaluation was made of the present optical disc. It was found that the jitter value following 1000 times of DOW was not higher than 10%.

Example 3

An optical disc of the same film structure as that of Example 2 was fabricated.

The materials and the thicknesses of the respective layers were as follows:

- transparent substrate 21: grooved polycarbonate substrate (1.1 mm in thickness)
- reflecting layer 22: Al alloy (165 nm in thickness)
- recording layer 25: $Ge_2Sb_2Te_5$ (14 nm in thickness)
- light transmission protective layer 30: UV light curable resin (0.1 mm in thickness)
- crystallization promoting layers 24, 26: SiC—H—O (4 nm in thickness)
- first dielectric layer 23: ZnS—$SiO_2$ (45 nm in thickness)
- second dielectric layer 27: ZnS—$SiO_2$ (20 nm in thickness)
- third dielectric layer 28: $SiO_2$ (10 nm in thickness)
- fourth dielectric layer 29: ZnS—$SiO_2$ (60 nm in thickness)

The calculated value of the Ac/Aa ratio of the present optical disc was 1.47.

Similar evaluation was made of the present optical disc. It was found that the jitter value following 1000 times of DOW was not higher than 14%.

Example 4

An optical disc of the same film structure as that of Example 2 was fabricated.

The materials and the thicknesses of the respective layers were as follows:

- transparent substrate 21: grooved polycarbonate substrate (1.1 mm in thickness)
- reflecting layer 22: Al alloy (165 nm in thickness)
- recording layer 26: $Ge_2Sb_2Te_5$ (14 nm in thickness)
- light transmission protective layer 30: UV light curable resin (0.1 mm in thickness)
- crystallization promoting layers 24, 26: SiC—H—O (4 nm in thickness)
- first dielectric layer 23: ZnS—$SiO_2$ (25 nm in thickness)
- second dielectric layer 27: ZnS—$SiO_2$ (13 nm in thickness)
- third dielectric layer 28: $SiO_2$ (65 nm in thickness)
- fourth dielectric layer 29: ZnS—$SiO_2$ (60 nm in thickness)

The calculated value of the Ac/Aa ratio of the present optical disc was 1.56.

Similar evaluation was made of the present optical disc. It was found that the jitter value following 1000 times of DOW was not higher than 11%.

Example 5

Figure 18:
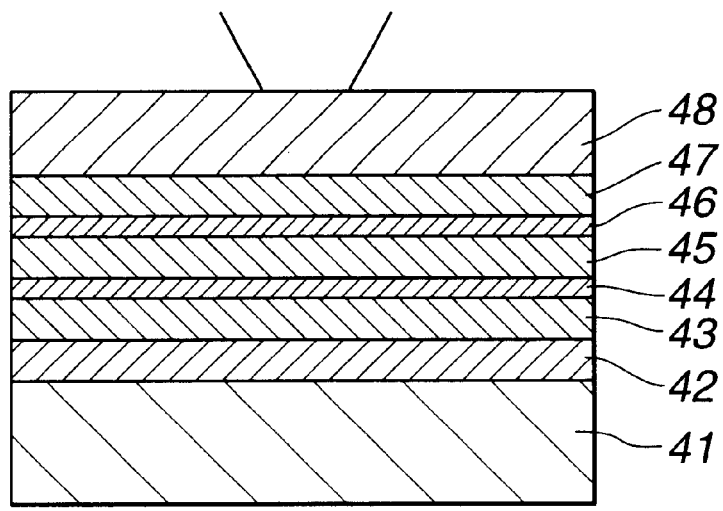
FIG. 18 is a schematic cross-sectional view showing a structure of an optical disc manufactured according to another alternative embodiment.

In the present Example, an optical disc configured as shown in FIG. 18 was fabricated. The present optical disc is comprised of a transparent substrate 41 on which were deposited a reflecting layer 42, a crystallization promoting layer 44, a recording layer 45, a crystallization promoting layer 46, a second dielectric layer 47 and a light transmission protective layer 48.

The materials and the thicknesses of the respective layers were as follows:

- transparent substrate 41: grooved polycarbonate substrate (1.2 mm in thickness)
- reflecting layer 42: Al alloy (165 nm in thickness)
- recording layer 45: $Ge_2Sb_2Te_5$ (14 nm in thickness)
- light transmission protective layer 48: polycarbonate sheet (0.1 mm in thickness)
- crystallization promoting layers 44, 46: SiC—H—O (4 nm in thickness)
- first dielectric layer 43: ZnS—$SiO_2$ (40 nm in thickness)
- second dielectric layer 47: ZnS—$SiO_2$ (90 nm in thickness)

It is noted that, in the present configuration, the dielectric layer is not the multi-layer, as in the previous Examples, so that the Ac/Aa ratio is lower, however, the Ac/Aa ratio is yet not lower than 1.2. The reason the Ac/Aa ratio is kept high despite this simplified structure is that the first dielectric layer 43 is of a thicker thickness of 40 nm.

The calculated value of the Ac/Aa ratio of the present optical disc was 1.31.

Similar evaluation was made of the present optical disc. It was found that the jitter value following 1000 times of DOW was not higher than 15%.

Example 6

An optical disc of the same film structure as that of Example 5 was fabricated.

The materials and the thicknesses of the respective layers were as follows:

- transparent substrate 41: grooved polycarbonate substrate (1.2 mm in thickness)
- reflecting layer 42: Al alloy (165 nm in thickness)
- recording layer 45: $Ge_2Sb_2Te_5$ (14 nm in thickness)
- light transmission protective layer 48: polycarbonate sheet (0.1 mm in thickness)

crystallization promoting layers 44, 46: SiC—H—O (4 nm in thickness)

first dielectric layer 43: ZnS—SiO$_2$ (35 nm in thickness)

second dielectric layer 47: SiO$_2$ (90 nm in thickness)

The calculated value of the Ac/Aa ratio of the present optical disc was 1.25.

Similar evaluation was made of the present optical disc. It was found that the jitter value following 1000 times of DOW was not higher than 15%.

Example 7

Figure 19:
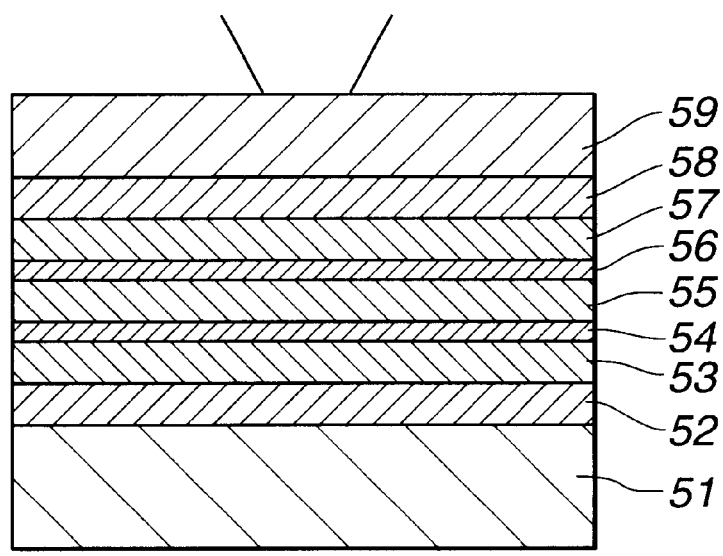
FIG. 19 is a schematic cross-sectional view showing a structure of an optical disc manufactured according to still another alternative embodiment.

In the present Example, an optical disc configured as shown in FIG. 19 was prepared. This optical disc is comprised of a transparent substrate 51, on which are deposited a reflecting layer 52, a first dielectric layer 53, a crystallization promoting layer 54, a recording layer 55, a second dielectric layer 57, a third dielectric layer 58 and a light transmission protective layer 59. The materials and thicknesses of the respective layers are as follows:

transparent substrate 51: grooved polycarbonate substrate (1.1 mm in thickness)

reflecting layer 52: Al alloy (165 nm in thickness)

recording layer 55:Ge$_2$Sb$_2$Te$_5$ (14 nm in thickness)

light transmission protective layer 59: polycarbonate sheet (0.1 mm in thickness)

crystallization promoting layers 54, 56: SiC—H—O (4 nm in thickness)

first dielectric layer 53: ZnS—SiO$_2$ (36 nm in thickness)

second dielectric layer 57: ZnS—SiO$_2$ (13 nm in thickness)

third dielectric layer 58: SiO$_2$ (65 nm in thickness)

The calculated value of the Ac/Aa ratio of the present optical disc was 1.33.

Similar evaluation was made of the present optical disc. It was found that the jitter value following 1000 times of DOW was not higher than 15%.

Example 8

In the present Example, an optical disc similar to that of was prepared. The materials and thicknesses of the respective layers are as follows:

transparent substrate 51: grooved polycarbonate substrate (1.1 mm in thickness)

reflecting layer 52: Al alloy (165 nm in thickness)

recording layer 55:Ge$_2$Sb$_2$Te$_5$ (14 nm in thickness)

light transmission protective layer 59: UV light curable resin (0.1 mm in thickness)

crystallization promoting layers 54, 56: SiC—H—O (4 nm in thickness)

first dielectric layer 53: ZnS—SiO$_2$ (45 nm in thickness)

second dielectric layer 57: ZnS—SiO$_2$ (20 nm in thickness)

third dielectric layer 58: ZnS (50 nm in thickness)

The calculated value of the Ac/Aa ratio of the present optical disc was 1.38.

Similar evaluation was made of the present optical disc. It was found that the jitter value following 1000 times of DOW was not higher than 15%.

Example 9

Figure 20:
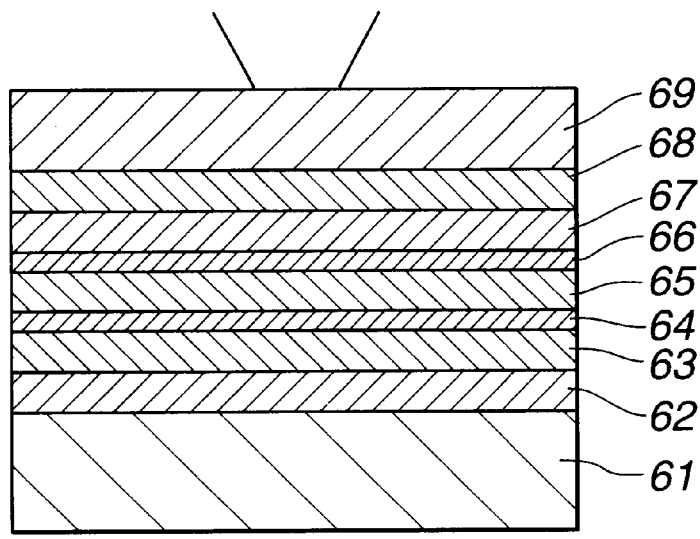
FIG. 20 is a schematic cross-sectional view showing a structure of an optical disc manufactured according to still another alternative embodiment.

In the present Example, an optical disc configured as shown in FIG. 20 was prepared. This optical disc is comprised of a transparent substrate 61, on which are deposited a reflecting layer 62, a first dielectric layer 63, a crystallization promoting layer 64, a recording layer 65, a second dielectric layer 67, a light absorption controlling layer 68 and a light transmission protective layer 69. The materials and thicknesses of the respective layers are as follows:

transparent substrate 61: grooved polycarbonate substrate (1.2 mm in thickness)

reflecting layer 62: Al alloy (165 nm in thickness)

recording layer 65:Ge$_2$Sb$_2$Te$_5$ (14 nm in thickness)

light absorption controlling layer 68: Ag (16 nm in thickness)

light transmission protective layer 69: polycarbonate sheet (0.1 mm in thickness)

crystallization promoting layers 64, 66: SiC—H—O (4 nm in thickness)

first dielectric layer 63: ZnS—SiO$_2$ (20 nm in thickness)

second dielectric layer 57: ZnS—SiO$_2$ (30 nm in thickness)

The calculated value of the Ac/Aa ratio of the present optical disc was 1.38.

Similar evaluation was made of the present optical disc. It was found that the jitter value following 1000 times of DOW was not higher than 15%.

Example 10

Figure 21:
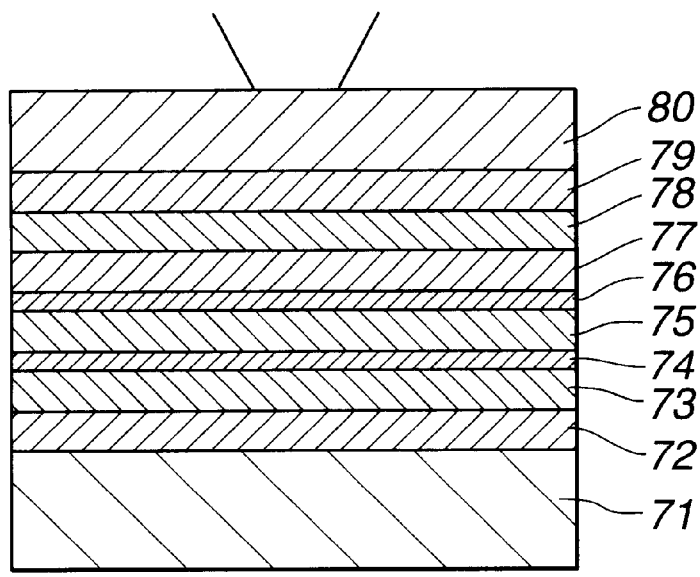
FIG. 21 is a schematic cross-sectional view showing a structure of an optical disc manufactured according to still another alternative embodiment.

In the present Example, an optical disc configured as shown in FIG. 21 was prepared. This optical disc is comprised of a transparent substrate 71, on which are deposited a reflecting layer 72, a first dielectric layer 73, a crystallization promoting layer 74, a recording layer 75, a crystallization promoting layer 76, a second dielectric layer 77, a light absorption controlling layer 78, a third dielectric layer 79 and a light transmission protective layer 80. The materials and thicknesses of the respective layers are as follows:

transparent substrate 71: grooved polycarbonate substrate (1.1 mm in thickness)

reflecting layer 72: Al alloy (165 nm in thickness)

recording layer 75:Ge$_2$Sb$_2$Te$_5$ (14 nm in thickness)

light absorption controlling layer 78: Au (10 nm in thickness)

light transmission protective layer 80: polycarbonate sheet (0.1 mm in thickness)

crystallization promoting layers 74, 76: SiC—H—O (4 nm in thickness)

first dielectric layer 73: ZnS—SiO$_2$ (35 nm in thickness)

second dielectric layer 77: ZnS—SiO$_2$ (50 nm in thickness)

third dielectric layer 79: ZnS—SiO$_2$ (10 nm in thickness)

The calculated value of the Ac/Aa ratio of the present optical disc was 1.27.

Similar evaluation was made of the present optical disc. It was found that the jitter value following 1000 times of DOW was not higher than 15%.

Example 11

Figure 22:
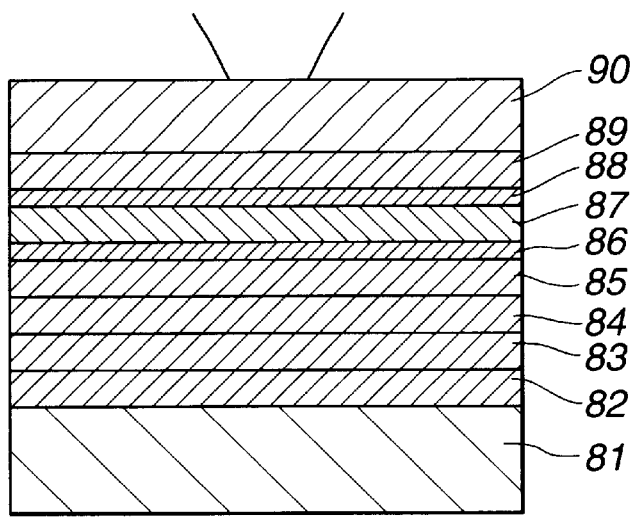
FIG. 22 is a schematic cross-sectional view showing a structure of an optical disc manufactured according to yet another alternative embodiment.

In the present Example, an optical disc configured as shown in FIG. 22 was prepared. This optical disc is comprised of a transparent substrate 81, on which are deposited a reflecting layer 82, a first dielectric layer 83, a second dielectric layer 84, a third dielectric layer 85, a crystallization promoting layer 86, a reflecting layer 87, a crystallization promoting layer 88, a fourth dielectric layer 89 and a light transmission protective layer 90.

The materials and thicknesses of the respective layers are as follows:

transparent substrate 81: grooved polycarbonate substrate (1.1 mm in thickness)

reflecting layer 82: Al alloy (165 nm in thickness)

recording layer 87: $Ge_2Sb_2Te_5$ (14 nm in thickness)

light transmission protective layer 90: polycarbonate sheet (0.1 mm in thickness)

crystallization promoting layers 86, 88: SiC—H—O (4 nm in thickness)

first dielectric layer 83: $ZnS$—$SiO_2$ (5 nm in thickness)

second dielectric layer 84: $ZnS$—$SiO_2$ (5 nm in thickness)

third dielectric layer 85: $ZnS$—$SiO_2$ (40 nm in thickness)

fourth dielectric layer 89: $ZnS$—$SiO_2$ (60 nm in thickness)

The calculated value of the Ac/Aa ratio of the present optical disc was 1.45.

Similar evaluation was made of the present optical disc. It was found that the jitter value following 1000 times of DOW was not higher than 15%.

Example 12

In the present Example, a GaN based semiconductor laser, with a wavelength of 400 nm, was used as a recording and/or reproducing laser. In the present Example, the optical disc configured similarly to the optical disc of Example 2 was used. The evaluation conditions are the same as those in the previous Examples, except for:

laser wavelength: 400 nm laser wavelength: 400 nm (GaN based semiconductor laser)

channel clocks: 62 MHz liner density: 0.130 μm/bit

Figure 23:
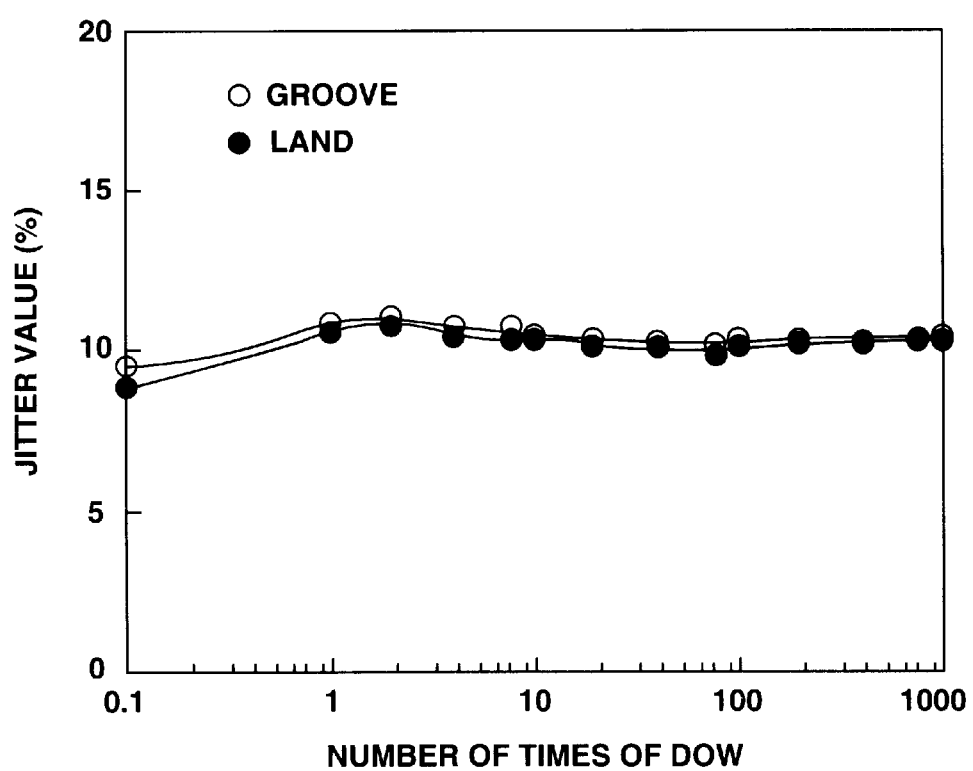
FIG. 23 is a graph showing changes in the jitter value with the number of times of overwriting in case of using a GaN based semiconductor laser.
Figure 24:
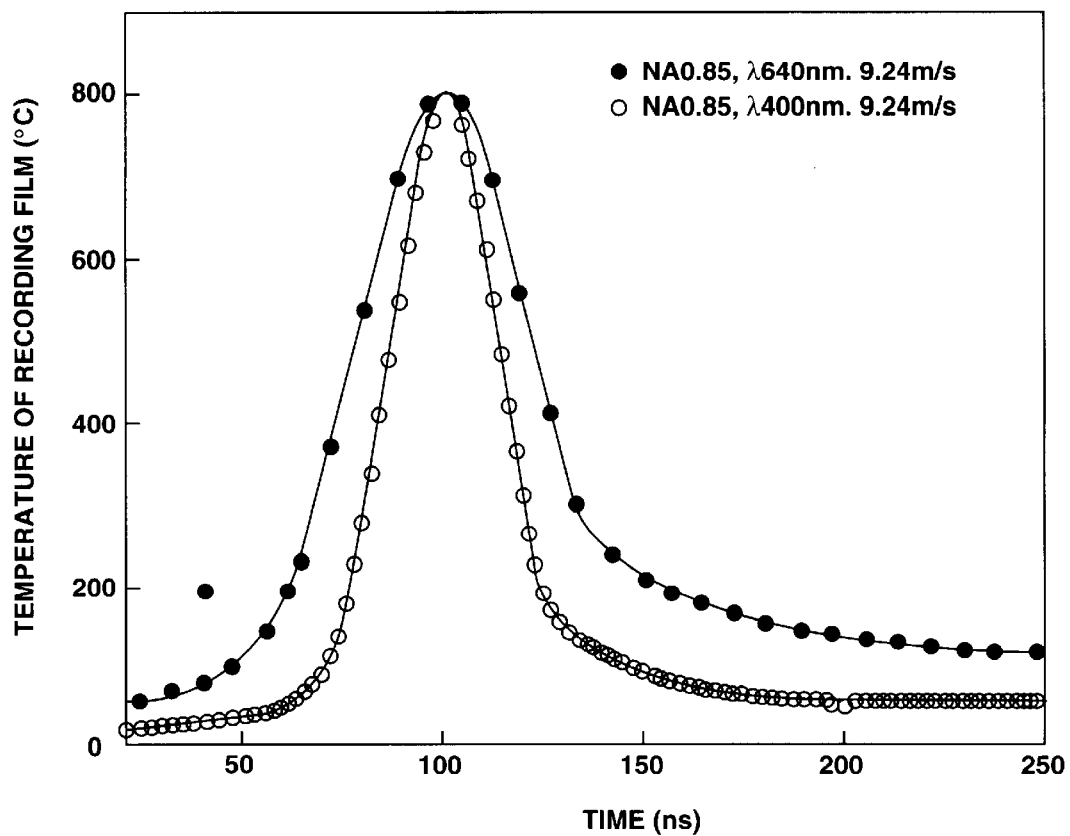
FIG. 24 is a graph showing difference in the crystallization temperature holding time with the difference in the linear speed, numerical aperture NA and the wavelength.
Figure 25:
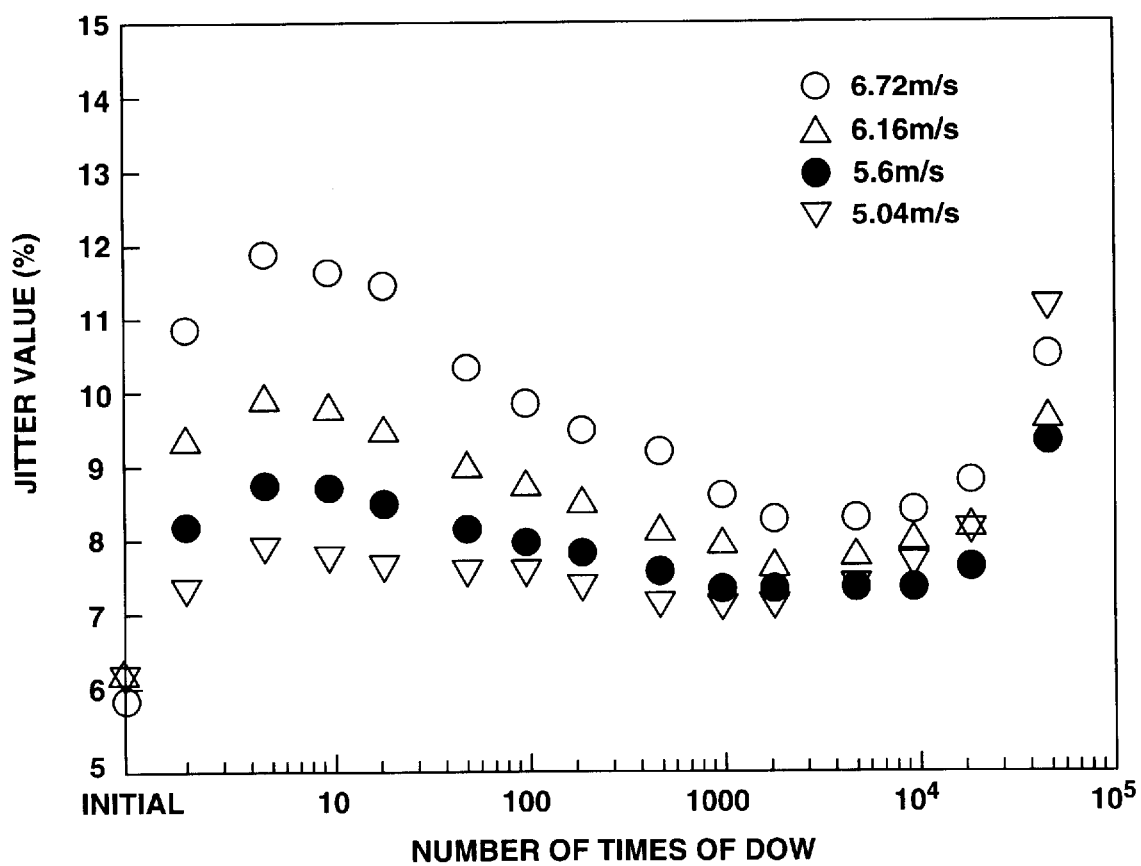
FIG. 25 is a graph showing the relation between the linear velocity and the jitter in a conventional phase change optical disc.

The results of evaluation are shown in FIG. 23. The jitter value was not higher than 11% after 100 times of DOW.

What is claimed is:

1. An optical recording medium comprising a recording layer formed at least of a phase change material, with the wavelength of the recording and/or reproducing laser light being 380 to 420 nm, wherein a ratio Ac/Aa, where Ac is the absorption rate of said recording layer in a crystalline state and Aa is the absorption rate of said recording layer in an amorphous state, is not less than 0.9, and wherein a crystallization promoting layer promoting the crystallization of said phase change material is contacted with at least one surface of said recording layer.

2. The optical recording medium according to claim 1 wherein said recording layer is formed on a substrate.

3. The optical recording medium according to claim 1 further comprising:

a reflecting layer.

4. The optical recording medium according to claim 1 further comprising:

a dielectric layer.

5. The optical recording medium according to claim 1 wherein a recording layer having a crystallization promoting layer is formed on said substrate;

a light transmission protective layer having a thickness not larger than 0.3 mm is formed on said recording layer having said crystallization promoting layer; and wherein the recording and/or reproducing light is illuminated from the side of said light transmission protective layer.

6. The optical recording medium according to claim 5 wherein said light transmission protective layer has a thickness of 3 to 177 μm.

7. The optical recording medium according to claim 6 wherein said light transmission protective layer is formed of polycarbonate or UV light curable resin.

8. The optical recording medium according to claim 5 wherein a reflecting layer is formed on said substrate and wherein a reflecting layer having a crystallization promoting layer is layered thereon.

9. The optical recording medium according to claim 1 wherein a ratio Ac/Aa, where Ac is the absorption rate of said recording layer in a crystalline state and Aa is the absorption rate of said recording layer in an amorphous state, is not less than 1.2.

10. The optical recording medium according to claim 1 wherein the absorption rate Aa of said reflecting layer in the amorphous state is not higher than 50%.

11. The optical recording medium according to claim 1 wherein the crystallization promoting material is at least one selected from Si—C, Si—C—O, Si—C—H, Si—C—H—O, Si—N, Si—N—O, Si—N—H, Si—N—H—O, Si—C, Si—C—N, Si—C—N—O, Si—C—N—H, Si—N—H—O, Si—O, Si—O—H, Al—N and Al—O.

12. The optical recording medium according to claim 1 wherein said recording layer contains a Ge—Sb—Te based material as a recording material.

13. The optical recording medium according to claim 8 wherein said recording layer contains $Ge_xSb_yTe_z$, as a recording material, where x, y and z represent the atomic ratio of each element, with $17 \leq x \leq 25$, $17 \leq y \leq 25$ and $45 \leq z \leq 65$.

14. The optical recording medium according to claim 1 wherein said recording layer contains nitrogen and/or oxygen.

15. The optical recording medium according to claim 3 wherein said reflecting layer has a reflective power in a wavelength range of said recording and/or reproducing laser light, and has a thermal conductivity of 0.0004 J/cm·K·δ to 4.5 J/cm·K·δ.

16. The optical recording medium according to claim 3 wherein said reflecting layer is at least one selected from the group consisting of a metal, a metalloid, a semiconductor, a compound or a mixture thereof.

17. The optical recording medium according to claim 3 wherein said reflecting layer has a transmittance of not less than 10% with respect to the recording and/or reproducing laser light in a mono-layer state and wherein the transmitance of the entire optical recording medium is not lower than 1%.

18. The optical recording medium according to claim 3 wherein said reflecting layer is comprised of Al, Ag, Au, Si or Ge, by itself, a compound or a mixture containing Al, Ag, Au, Si or Ge as main ingredients.

19. The optical recording medium according to claim 3 wherein said reflecting layer is a mixture of at least one selected from the group consisting of a metal, a metalloid and a compound or a mixture with a dielectric material.

20. The optical recording medium according to claim 19 wherein said dielectric material is a $ZnS$—$SiO_2$ mixture.

21. The optical recording medium according to claim 20 wherein the content of $SiO_2$ in said $ZnS$—$SiO_2$ mixture is 15 to 35 mol %.

22. The optical recording medium according to claim 3 wherein said reflecting layer is formed by a plurality of layers of different materials layered together.

23. The optical recording medium according to claim 1 wherein said recording layer is formed by a plurality of layers of different materials layered together.

24. The optical recording medium according to claim 5 wherein a dielectric layer is provided between the light transmission protective layer and the recording layer, between the recording layer and the reflecting layer or between the reflecting layer and the substrate.

25. The optical recording medium according to claim 4 wherein said dielectric layer is formed of a dielectric material with an extinction coefficient k not larger than 0.3 in the wavelength range of the recording and/or reproducing laser light.

26. The optical recording medium according to claim 4 wherein said dielectric layer is dielectric layer is formed by plural consecutive layers and at least one of the layers is formed of a different material.

27. The optical recording medium according to claim 26 wherein the difference in the refractive indices n of two neighboring ones of the dielectric layers is not less than 0.2.

28. The optical recording medium according to claim 27 wherein said plural layers include layers formed of a $ZnS$—$SiO_2$ mixture and an $SiO_x$, where $1 \leq x \leq 2$.

29. The optical recording medium according to claim 8 wherein said recording layer includes a Ge—Sb—Te based material as a recording material, said reflecting layer is formed of an Al-based or Ag based material, said crystallization promoting material includes a Si—C based material and wherein said dielectric layer is formed of a $ZnS$—$SiO_2$ mixture.

30. The optical recording medium according to claim 29 wherein the reflecting layer, first dielectric layer, first crystallization promoting layer, second crystallization promoting layer, second dielectric layer and the light transmission protective layer are sequentially formed on said substrate.

31. The optical recording medium according to claim 30 wherein the substrate thickness, reflecting layer thickness, first dielectric layer thickness, first crystallization promoting layer thickness, recording layer thickness, second crystallization promoting layer thickness and the light transmission protective layer thickness are 1.0 to 1.2 mm, 5 to 200 nm, 5 to 70 nm, 1 to 20 nm, 5 to 25 nm, 1 to 20 nm and 0.05 to 0.15 nm and wherein the second dielectric layer is a mono- or layered film containing a dielectric layer having a thickness at least equal to 5 to 100 nm.

32. The optical recording medium according to claim 1 wherein a light absorption controlling layer is provideed on the recording and/or reproducing laser light incident side of the recording layer having the crystallization promoting layer.

33. The optical recording medium according to claim 5 wherein a light absorption controlling layer is provided between the light transmission protective layer and the crystallization promoting layer.

34. The optical recording medium according to claim 32 wherein said light absorption controlling layer in the monolayer state has an absorption rate relative to the recording and/or reproducing laser light not less than 3% and a transmittance of not less than 3%.

35. The optical recording medium according to claim 34 wherein said light absorption controlling layer is formed of at least one of a metal, a metalloid, and a compound or a mixture thereof.

36. The optical recording medium according to claim 34 wherein said light absorption controlling layer is formed of at least one of an Au-based material, an Al-based material and an Ag-based material and has a thickness d such that 3 nm<d<30 nm.

37. The optical recording medium according to claim 34 wherein said light absorption controlling layer is formed of a mixture of at least one of a metal, a metalloid, and a compound or a mixture thereof with a dielectric material.

38. The optical recording medium according to claim 37 wherein said dielectric material is a $ZnS$—$SiO_2$ mixture.

39. The optical recording medium according to claim 38 wherein the content of $SiO_2$ in said $ZnS$—$SiO_2$ mixture is 15 to 35 mol %.

40. The optical recording medium according to claim 32 wherein the light absorption controlling layer is a consecutively layered assembly comprised of plural layers of different materials.

41. The optical recording medium according to claim 1 wherein a light source of said recording and/or reproducing laser light is a semiconductor laser or a gas laser.

* * * * *